(12) United States Patent
Glockseisen

(10) Patent No.: US 10,958,030 B2
(45) Date of Patent: Mar. 23, 2021

(54) JAW TOOL AND JAW TOOL GROUP

(71) Applicant: WEZAG GmbH Werkzeugfabrik, Stadtallendorf (DE)

(72) Inventor: Thomas Glockseisen, Duesseldorf (DE)

(73) Assignee: WEZAG GMBH WERKZEUGFABRIK, Stadtallendorf (DE)

( * ) Notice: Subject to any disclaimer, the term of this patent is extended or adjusted under 35 U.S.C. 154(b) by 310 days.

(21) Appl. No.: 15/961,229

(22) Filed: Apr. 24, 2018

(65) Prior Publication Data

US 2018/0309256 A1    Oct. 25, 2018

(30) Foreign Application Priority Data

Apr. 25, 2017   (EP) .................................... 17168040

(51) Int. Cl.
| | | |
|---|---|---|
| *B25B 27/14* | (2006.01) | |
| *H01R 43/048* | (2006.01) | |
| *G01L 5/00* | (2006.01) | |
| *H02G 1/00* | (2006.01) | |
| *H01R 43/042* | (2006.01) | |

(52) U.S. Cl.
CPC ....... *H01R 43/0486* (2013.01); *B25B 27/146* (2013.01); *G01L 5/0076* (2013.01); *H02G 1/005* (2013.01); *H01R 43/0421* (2013.01)

(58) Field of Classification Search
CPC .................. H01R 43/0486; G01L 15/0076
USPC ..................... 72/21.4, 409.01, 412, 414, 416
See application file for complete search history.

(56) References Cited

U.S. PATENT DOCUMENTS

| | | | |
|---|---|---|---|
| 4,794,780 A | | 1/1989 | Battenfeld |
| 4,825,735 A | * | 5/1989 | Undin ....................... B25B 7/04 |
| | | | 72/409.01 |
| 4,879,508 A | | 11/1989 | Andermo |

(Continued)

FOREIGN PATENT DOCUMENTS

| | | |
|---|---|---|
| DE | 37 08 727 A1 | 11/1987 |
| DE | 40 14 221 A1 | 11/1990 |

(Continued)

OTHER PUBLICATIONS

CustomCrimp, "Crimper Comparison Chart", Feb. 26, 2016, CustomCrimp, https://web.archive.org/web/20160226081636/http://www.customcrimp.com/index.php/products/custom-crimp-crimpers/crimper-comparison-items-3 (Year: 2016).*

(Continued)

*Primary Examiner* — Adam J Eiseman
*Assistant Examiner* — Dylan Schommer
(74) *Attorney, Agent, or Firm* — The Sladkus Law Group

(57) ABSTRACT

The invention relates to a pressing tool, crimping tool or cutting tool (1; 2; 3) with a tool jaw (5) which is supported at a supporting body (24) by a guidance (28) having a remaining measuring degree of freedom (26). The tool jaw (5) is supported at the supporting body (24) in the direction of the measuring degree of freedom (26) by a mechanical parallel arrangement of an elastic supporting element (14) and a sensor (84). Here, the stiffness of the elastic supporting element (14) is dimensioned such that for the maximum of the effective working force of the pressing tool, crimping tool or cutting tool (1; 2; 3) the sensor (84) has a maximum deflection of at least 0.1 mm or at least 1°.

26 Claims, 13 Drawing Sheets

(56) References Cited

U.S. PATENT DOCUMENTS

| | | | |
|---|---|---|---|
| 5,101,651 A * | 4/1992 | Yeomans | B30B 15/0094 |
| | | | 29/753 |
| 5,153,984 A | 10/1992 | Beetz et al. | |
| 5,187,968 A | 2/1993 | Beetz et al. | |
| 5,195,042 A | 3/1993 | Ferraro et al. | |
| 5,490,406 A | 2/1996 | College | |
| 5,526,570 A | 6/1996 | Beetz et al. | |
| 5,913,933 A | 6/1999 | Beetz et al. | |
| 6,026,671 A | 2/2000 | Battenfeld | |
| 6,053,025 A | 4/2000 | Beetz et al. | |
| 6,072,638 A | 6/2000 | Enomoto | |
| 6,155,095 A | 12/2000 | Beetz | |
| 6,612,147 B2 | 9/2003 | Beetz et al. | |
| 6,877,228 B2 | 4/2005 | Beetz et al. | |
| 6,910,363 B2 | 6/2005 | Beetz et al. | |
| 7,155,954 B2 | 1/2007 | Battenfeld | |
| 7,534,973 B2 * | 5/2009 | Voelckers | G06F 3/0234 |
| | | | 200/5 R |
| 7,793,571 B2 | 9/2010 | Streuli | |
| 8,079,242 B2 | 12/2011 | Pacaud et al. | |
| 8,113,031 B2 | 2/2012 | Battenfeld et al. | |
| 8,127,589 B2 | 3/2012 | Battenfeld | |
| 8,230,715 B2 | 7/2012 | Battenfeld et al. | |
| 8,245,560 B2 | 8/2012 | Battenfeld et al. | |
| 8,296,956 B2 | 10/2012 | Battenfeld | |
| 8,516,872 B2 | 8/2013 | Battenfeld et al. | |
| 8,601,856 B2 | 12/2013 | Battenfeld | |
| 9,583,904 B2 | 2/2017 | Battenfeld | |
| 9,634,451 B2 | 4/2017 | Battenfeld | |
| 9,864,948 B2 | 1/2018 | Glockseisen | |
| 9,989,427 B2 * | 6/2018 | Teshigawara | G01L 5/166 |
| 2011/0072593 A1 * | 3/2011 | Battenfeld | B25B 7/22 |
| | | | 7/107 |
| 2013/0104669 A1 * | 5/2013 | Umetsu | G01L 5/16 |
| | | | 73/862.041 |
| 2014/0047885 A1 * | 2/2014 | Battenfeld | H01R 43/0486 |
| | | | 72/21.4 |
| 2016/0273987 A1 * | 9/2016 | Masuda | G01L 9/0073 |
| 2017/0113358 A1 | 4/2017 | Glockseisen et al. | |
| 2017/0113367 A1 | 4/2017 | Zinser | |
| 2017/0144289 A1 * | 5/2017 | Yamashita | H01H 9/061 |
| 2017/0239788 A1 | 8/2017 | Battenfeld | |

FOREIGN PATENT DOCUMENTS

| | | | | |
|---|---|---|---|---|
| DE | 40 23 337 C1 | 10/1991 | | |
| DE | 40 39 435 C1 | 6/1992 | | |
| DE | 40 26 332 C2 | 7/1992 | | |
| DE | 42 41 224 C1 | 1/1994 | | |
| DE | 43 03 180 C1 | 1/1994 | | |
| DE | 43 37 796 A1 | 5/1995 | | |
| DE | 44 27 553 C2 | 6/1998 | | |
| DE | 197 09 639 A1 | 9/1998 | | |
| DE | 298 03 336 U1 | 9/1998 | | |
| DE | 298 06 179 U1 | 11/1998 | | |
| DE | 198 02 287 C1 | 12/1998 | | |
| DE | 197 13 580 C2 | 12/1999 | | |
| DE | 198 32 884 C1 | 12/1999 | | |
| DE | 199 32 952 A1 | 1/2000 | | |
| DE | 697 00 589 T2 | 5/2000 | | |
| DE | 198 07 737 C2 | 6/2000 | | |
| DE | 198 34 859 C2 | 1/2001 | | |
| DE | 199 32 961 A1 | 1/2001 | | |
| DE | 199 32 962 A1 | 1/2001 | | |
| DE | 199 63 097 C1 | 4/2001 | | |
| DE | 199 24 087 C2 | 6/2002 | | |
| DE | 100 56 900 C1 | 8/2002 | | |
| DE | 199 24 086 C2 | 8/2002 | | |
| DE | 197 53 436 C2 | 10/2002 | | |
| DE | 101 32 413 C2 | 7/2003 | | |
| DE | 102 28 185 A1 | 1/2004 | | |
| DE | 102 42 345 B3 | 2/2004 | | |
| DE | 103 46 241 B3 | 8/2004 | | |
| DE | 101 40 270 B4 | 9/2004 | | |
| DE | 10 2005 003 617 B3 | 6/2006 | | |
| DE | 10 2005 003 615 B3 | 9/2006 | | |
| DE | 19932962 B4 * | 1/2008 | | H01R 43/042 |
| DE | 20 2008 003 703 U1 | 6/2008 | | |
| DE | 10 2007 038 626 B3 | 10/2008 | | |
| DE | 10 2008 005 472 B4 | 2/2009 | | |
| DE | 10 2007 050 176 A1 | 4/2009 | | |
| DE | 10 2008 003 524 B4 | 12/2009 | | |
| DE | 10 2008 012 011 B3 | 12/2009 | | |
| DE | 10 2008 030 773 A1 | 12/2009 | | |
| DE | 102008030773 A1 * | 12/2009 | | H01R 43/0421 |
| DE | 10 2007 001 235 B4 | 6/2010 | | |
| DE | 10 2010 061 148 A1 | 6/2012 | | |
| DE | 10 2004 009 489 B4 | 9/2013 | | |
| DE | 10 2011 052 967 B4 | 12/2013 | | |
| EP | 0 471 977 B1 | 7/1991 | | |
| EP | 1 071 173 A2 | 7/2000 | | |
| EP | 1 724 101 A1 | 5/2005 | | |
| EP | 2 043 818 B1 | 8/2006 | | |
| EP | 1 990 874 B1 | 4/2008 | | |
| EP | 2 305 428 A1 | 9/2009 | | |
| EP | 2 463 969 A2 | 12/2011 | | |
| EP | 2 672 580 A1 | 6/2012 | | |
| EP | 2 562 891 B1 | 8/2012 | | |
| EP | 2 698 885 A1 | 7/2013 | | |
| EP | 2 826 598 A1 | 7/2013 | | |
| EP | 2 826 598 B1 | 7/2013 | | |
| EP | 3 067 679 A1 | 4/2014 | | |
| EP | 2 995 424 A1 | 9/2014 | | |
| EP | 3 012 923 A1 | 10/2014 | | |
| EP | 3 012 924 A1 | 10/2014 | | |
| EP | 3 159 088 A1 | 10/2015 | | |
| EP | 3 159 107 A1 | 10/2015 | | |
| EP | 3 208 044 A1 | 2/2016 | | |
| WO | 90/00098 A1 | 1/1990 | | |
| WO | 1997 025757 A1 | 7/1997 | | |

OTHER PUBLICATIONS

ThomasNet, "How Are Springs Made?", Apr. 3, 2010, ThomasNet, https://web.archive.org/web/20100403152745/https://www.thomasnet.com/articles/machinery-tools-supplies/how-are-springs-made/ (Year: 2010).*

Klein Tools, Ratcheting Crimper Frame VDV200-010, Sep. 15, 2015, Klein Tools, https://web.archive.org/web/20150915044437/http://www.kleintools.com/sites/all/product_assets/catalog_imagery/klein/vdv200-010.jpg (Year: 2015).*

Klein Tools, Klein Tools VDV200-010 Ratcheting Crimper Frame, Nov. 17, 2009, Amazon, https://www.amazon.com/Ratcheting-Crimper-Klein-Tools-VDV200-010/dp/B00788LS0S/ref=sr_1_15?c=ts&dchild=1&keywords=Crimpers&qid=1600800495&refinements=p_89%3AKlein+Tools&sr=8-15&ts_id=553392 (Year: 2009).*

Anonymous: "Making Accurate Strain Measurements—Improving SNR and Determining Optimal Excitation Levels—National Instruments", Mar. 19, 2012 (Mar. 19, 2012), XP055587015.

Anonymous: "Signal-to-noise ratio—Wikipedia", Apr. 7, 2017 (Apr. 7, 2017), XP055587016.

European Office Action dated May 14, 2019 relating to co-pending, related EP Application No. 17 168 040.8.

* cited by examiner

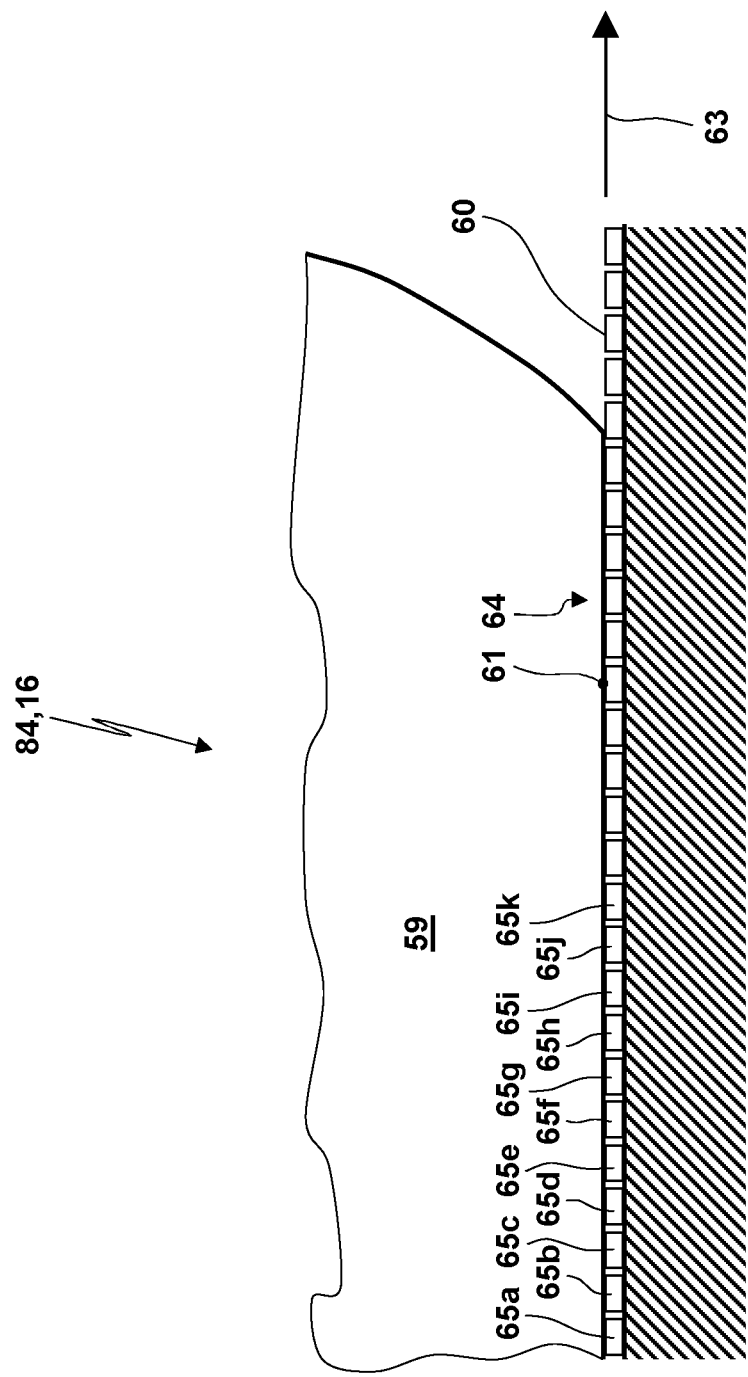

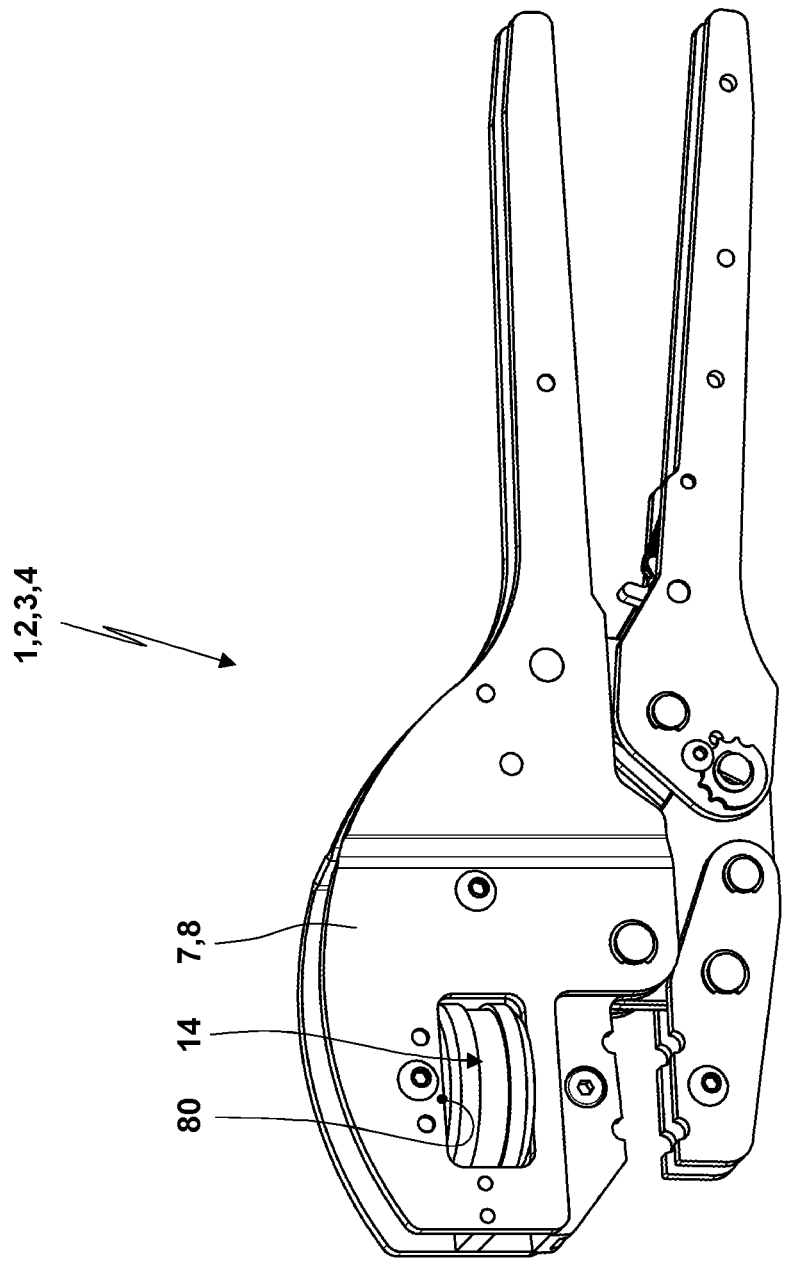

JAW TOOL AND JAW TOOL GROUP

CROSS REFERENCE TO RELATED APPLICATIONS

This application claims priority to co-pending European patent application No. EP 17 168 040.8 filed on Apr. 25, 2017.

FIELD OF THE INVENTION

The invention relates to a jaw tool, i.e. a tool comprising tool jaws which are used for processing a workpiece wherein the tool jaws are displaced or pivoted from an open position to a closed position over a working stroke. In the following reference will be made to an embodiment of the jaw tool as a pressing tool, a crimping tool or a cutting tool. Furthermore, the invention relates to a jaw tool group comprising jaw tools of different types.

A pressing tool might e.g. be embodied as manually actuated pressing pliers for pressing sockets, cubes or fittings as these are e.g. described in one of the publications DE 197 09 639 A1, DE 198 34 859 C2, DE 199 24 086 C2, DE 199 24 087 C2, DE 199 63 097 01, DE 103 46 241 B3 (corresponding to U.S. Pat. No. 7,155,954 B2), DE 10 2007 001 235 B4 (corresponding to U.S. Pat. No. 8,127,589 B2), DE 10 2008 005 472 B3 (corresponding to U.S. Pat. No. 8,245,560 B2), EP 2 995 424 A1 (corresponding to U.S. Pat. No. 9,864,948 B2) and EP 2 826 598 A1 or the not pre-published European patent application EP 16 156 231.9 (published as EP 3 208 044 A1, corresponding to US 2017/0239788 A1).

A crimping tool might e.g. be embodied as manually actuated crimping pliers which serve for crimping a plug or connector to an electrical conductor and/or which might have a design according to the not pre-published European patent application EP 16 156 231.9 or one of the publications EP 3 012 924 A1 (corresponding to U.S. Pat. No. 9,583,904 B2), EP 3 012 923 A1 (corresponding to U.S. Pat. No. 9,634,451 B2), EP 2 698 885 A1 (corresponding to US 2014/0047885 A1), EP 2 672 580 A1, EP 2 463 969 A2 (corresponding to U.S. Pat. No. 8,601,856 B2), DE 37 08 727 C2 (corresponding to U.S. Pat. No. 4,794,780 A), DE 40 23 337 C1 (corresponding to U.S. Pat. No. 5,153,984 A), DE 40 26 332 C2, DE 40 39 435 C1 (corresponding to U.S. Pat. No. 5,187,968 A), DE 42 41 224 C1, DE 44 27 553 C2, DE 197 13 580 C2 (corresponding to U.S. Pat. No. 5,913,933 A), DE 197 53 436 C2, DE 198 02 287 C1 (corresponding to U.S. Pat. No. 6,053,025 A), DE 198 07 737 C2 (corresponding to U.S. Pat. No. 6,026,671 A), DE 298 03 336 U1, DE 198 32 884 01 (corresponding to U.S. Pat. No. 6,155,095 A), DE 100 56 900 C1 (corresponding to U.S. Pat. No. 6,612,147 B2), DE 101 32 413 C2 (corresponding to U.S. Pat. No. 6,877,228 B2), DE 101 40 270 B4, DE 102 42 345 B3 (corresponding to U.S. Pat. No. 6,910,363 B2), DE 10 2005 003 615 B3, DE 10 2005 003 617 B3, DE 10 2007 038 626 B3 (corresponding to U.S. Pat. No. 8,296,956 B2), DE 10 2008 003 524 B4 (corresponding to U.S. Pat. No. 8,113,031 B2), DE 10 2008 012 011 B3 (corresponding to U.S. Pat. No. 8,230,715 B2), DE 20 2008 003 703 U1, EP 1 724 101 A1, EP 2 305 428 A1 (corresponding to U.S. Pat. No. 8,516,872 B2), DE 10 2010 061 148 A1 (corresponding to U.S. Pat. No. 8,601,856 B2), DE 10 2011 052 967 B4 or corresponding to the manual crimping tool distributed by the applicant prior to the application date of the present patent application under the labels CS10, CSV10, CSV10-LWL, CSV10-FFC, AE, CS8, CK100, CS30, CS KTVR, CE/CG, CS150, CS200, CS210, CP600.

A cutting tool might e.g. be embodied as manually actuated cable cutting pliers and/or according to one of the not-pre-published European patent applications EP 15 191 264.9 (published as EP 3 159 088 A1, corresponding to US 2017/0113367 A1) and EP 15 191 261.5 (published as EP 3 159 107 A1, corresponding to US 2017/0113358 A1) or corresponding to the publication DE 43 03 180 C1 (corresponding to U.S. Pat. No. 5,526,570 A) or corresponding to a cutting tool which is distributed by the applicant at the application date of the present patent application under the label cable cutter SH.

Here, the invention is usable both for manually actuated tools as well as for tools wherein the actuation is provided under the assistance by a non-manual power source or solely by a non-manual power source (in particular under the assistance by a pneumatic drive, a hydraulic drive or an electric drive with the option that the electric drive might be powered via a cable by an external electric power source or also by an accumulator forming a component of the tool).

BACKGROUND OF THE INVENTION

The publication DE 10 2007 050 176 A1 discloses that when crimping a plug to an electric conductor by crimping pliers, the increasing complexity of cable looms, aggravated product liability and extended warranty claims require a quality control by a monitoring of the crimping force. A force measuring device is proposed which might be formed by a piezo-electric force sensor or by strain gauges. The force measuring device is arranged at the exterior of a crimping punch or also within the crimping punch or a crimping accommodation. Furthermore, the crimping pliers comprise a transmitter which is arranged above the crimping punch at the crimping pliers head. The transmitter transmits a wireless crimping force signal which is received and analyzed by a receiving and analyzing device. The transmitter can be activated and deactivated by manipulation elements. Furthermore, in some cases it is possible to adjust the frequency of the transmitter by these manipulation elements. In the transmitter a power source embodied as an electric battery or a rechargeable accumulator is provided for the supply of power to the transmitter and to the force measuring device. It is also proposed that the transmitter comprises an induction coil wherein an external magnetic field is able to generate an induction current used for recharging the accumulator. It is also proposed that a solar cell is mounted to the crimping pliers for recharging the accumulator. Finally, it is also proposed to provide a temporary cable connection. The transmitter comprises a display device at which it is possible to display the crimping force, the transmitting frequency, the presence of a wireless connection, the loading state of the power source and the like. The display device can be embodied as LED or LDC display device. Additionally, a displacement measuring system can be provided at the crimping pliers for sensing the working stroke of the crimping pliers. In order to avoid damages, the crimping pliers might comprise a latching device or slipping device which limits the applicable crimping force to a predefined force value. It is also proposed that receiving-analyzing-device is a commercially available personal computer having a Bluetooth receiver.

The publication DE 298 06 179 U1 describes that it is known from DE 40 14 221 A1 to monitor the quality of the produced crimping connection in a crimping press by sensing the crimping force. For this purpose, the crimping punch, the crimping die or the platform is embodied as a spring body with a strain gauge arranges thereat. The displacement of the crimping punch is sensed by an inductive displacement sensor. On this background, the publication proposes that a crimping force and the crimping displacement are also sensed for crimping pliers. For this purpose, a first force sensor is used which directly senses the crimping force in the bit of tongs. A second force sensor senses the opening displacement of the opening of the bit of tongs so that by means of this second force sensor indirectly the crimping displacement is sensed. As force sensors here strain gauges or piezo-electric forces sensors are used. A strain gauge can be arranged on a leaf spring which is tensioned during the closing movement of the crimping pliers. It is also proposed that the first force sensor is arranged at an intermediate part in the lever drive of the crimping pliers. For a temperature compensation a reference sensor can be used. Analyzing circuitry can be provided at the crimping pliers, the analyzing circuitry comprising a suitable display for informing the user of the crimping pliers during the crimping process about the quality of the crimping process. Also a data storage can be provided at the crimping pliers. In the data storage, it is possible to store force-displacement-progressions for different types of crimps (in particular different types of contacts) so that for a specific crimp the associated force-displacement-progression is available for the monitoring of the quality. A LED display or a liquid crystal display can be used as an optical display device at the crimping pliers. Additionally, a signal output via an acoustic indicating device is possible. If an acoustic indicating device or an optic display device consisting of LEDs is used, by these devices the successful execution of a crimping process can be confirmed by different colors or sounds. As an interface for a stationary computer, a wire-based or tethered interface or optical interface or any interface with a transmission over air which uses electromagnetic radiation in the visible range, infrared range or RF-range for the exchange of data can be used. Here, also a bi-directional interface can be used. It is also possible that the closing movement of the bit of tongs of the crimping pliers is supported by an electric servomotor. The monitoring of the crimping force progression might consist of comparing the measured crimping force progression with a predetermined crimping force progression, in some cases with a given tolerance region.

The patent DE 10 2004 009 489 B4 lists publications U.S. Pat. No. 5,195,042, DE 298 06 179, DE 199 32 952 (corresponding to U.S. Pat. No. 6,072,638 A) and DE 697 00 589 as relevant prior art concerning the use of displacement-force-measuring systems in the technical field of crimping. The patent DE 10 2004 009 489 B4 relates to an electronic monitoring of an adjusting process of crimping pliers.

In the patent application DE 10 2008 030 773 A1 the publications DE 40 14 221 A1, DE 43 37 796 A1, DE 199 32 962 A1, DE 298 06 179 U1 and U.S. Pat. No. 5,490,406 A are listed as relevant prior art concerning known electronic devices for the force-displacement-measurement in crimping pliers. Also this patent application relates to the electronic monitoring of an adjusting process of the crimping pliers. Here, a sensor system is used which senses the crimping displacement in an absolute or incremental fashion. By a control, monitoring and analyzing unit it is possible to generate an electronic indication at an LDC display. A cassette can be used into which a computer system as well as a constructional unit serving as the accommodating device and as the adjusting device with the sensor system are integrated. Constructional units can be assembled with and disassembled from already completely assembled pliers so that an exchange according to the specific needs is possible.

The European patent EP 1 990 874 B1 (corresponding to U.S. Pat. No. 8,079,242 B2) relates to crimping pliers with preferably four punches being pressed radially towards a longitudinal axis of a plug. Here, the punches are actuated corresponding to a rotational movement of an actuation ring. The actuation movement of the actuation ring is sensed by a sensor. Furthermore, an identification sensor senses identification data of a tool for positioning the plug. Here, the identification sensor might be a HF-label. Additionally, another sensor for sensing a movement of a punch and a force sensor for sensing the crimping force can be provided. The crimping pliers might comprise an interface by which via a bi-directional connection data can be transferred. However the transfer can also be provided in a wireless fashion.

The European patent EP 2 043 818 B1 (corresponding to U.S. Pat. No. 7,793,571 B2) relates to the provision of a signaling device at manually operated pliers. The signaling device makes the approaching of a predefined closing force tangibly for the hand of the user. Here, the signaling device is embodied as a vibrator integrated into a hand lever.

The publication EP 2 698 885 A1 (corresponding to US 2014/0047885 A1) discloses a crimping machine wherein different exchangeable adapters are used. The exchangeable adapters each comprise a crimping punch as well as an anvil. Furthermore, in each of the exchangeable adapters a sensor is integrated by which it is possible to sense a crimping force and/or a crimping displacement. Here, in the different exchangeable adapters sensors having differing measurement regions can be used for different applications. A force sensor can be integrated into a recess of the anvil or of the punch of the exchangeable adapter. A deflection of the anvil or the punch should then lead to a bias of the sensor with a force, the sensor being is arranged within the recess. In this case, the elastically deformable regions of the anvil or the punch are described to be arranged in mechanical parallel connection to the support via the sensor. The exchangeable adapter and the force sensor of the exchangeable adapter can be calibrated within the factory or after the delivery of the exchangeable adapter. Determined calibration factors or calibration curves can be modelled or stored in a control unit which is integrated into the exchangeable adapter.

Further prior art is known from the publications EP 1 071 173 A2, EP 3 067 679 A1, WO 90/00098 A1 and DE 199 32 961 A1.

SUMMARY OF THE INVENTION

The invention bases on the object to propose a jaw tool (in particular a pressing tool, crimping tool or cutting tool) as well as a jaw tool group comprising jaw tools comprising an integrated sensor and being improved with respect to
- the used measurement principle,
- the manufacturing costs,
- the biasing of the sensor with the force,
- a protection of the sensor against an overload,
- the use for a tool group or for pressing tools, crimping tools or cutting tools of different types or for different applications,
- the calibration of the sensor,
- the measurement precision and/or
- the influence of error sources.

One embodiment of the present invention bases on the finding that the person with skill in the art when equipping a pressing tool, crimping tool or cutting tool with a force sensor for sensing the working force assumed that the force sensor has to be integrated in such a way into the force flow of the pressing tool, crimping tool or cutting tool that the stiffness of the components arranged in the force flow is as high as possible. Also from this reason in pressing tools, crimping tools and cutting tools strain gauges or piezo-electric force sensors are used which feature a high stiffness and the deflections of which are generally in the region of a per mill of the extension of the force sensor in measuring direction.

On the other hand, one embodiment of invention bases on the finding that force sensors used at present and their integration into the pressing tool, crimping tool and cutting tool lead to disadvantages. One disadvantage is that error sources as in particular vibrations, changes of the temperature and coinciding changes of the dimensions of the components of the pressing tool, crimping tool and cutting tool, manufacturing tolerances as e.g. a play in joints of the drive mechanism, tensions of the material, electric interferences might have effects in the order of the deflections which form the basis for determining the measurement signal of the force sensor. Accordingly, the force sensors used according to the prior art in some cases generate a measurement signal which is imprecise and depends on the aforementioned error sources. A reduction of the influence of error sources of this type in some cases requires regular post-calibrations.

Embodiments of the invention consider the aforementioned findings by arranging two components in the force flow in the pressing tool, crimping tool or cutting tool. Between the two components, an elastic supporting element and a sensor are arranged in mechanical parallel arrangement. Due to the mechanical parallel arrangement, the sensor and the elastic supporting element have deflections which correlate to each other and which result from an effective working force of the pressing tool, crimping tool or cutting tool over the working stroke. If the components are e.g. moved along a straight line over the working stroke relative to each other, the deflections of the elastic supporting element and the sensor are the same. If instead the two components are pivoted relative to each other over the working stroke, the relation of the deflections of the elastic supporting element and the sensor corresponds to the relation of the distances of the supporting element and the sensor from the pivot axis of the components.

By the constructive choice of the stiffness of the elastic supporting element it is possible to define the extent of the deflection of the sensor during the working stroke of the pressing tool, crimping tool or cutting tool by constructive measures. Here, embodiments of the invention overcome the above mentioned prejudice of the experts that the deflection of the sensor has to be as small as possible. Instead, embodiments of the invention propose to dimension the stiffness of the elastic supporting element such that for the maximum of the applicable working force of the pressing tool, crimping tool or cutting tool the sensor has a maximum of the deflection which is (in the case that the two components of the sensor being moved relative to each other are moved with a translatory relative movement which generates measurement signal) at least 0.1 mm (in particular even at least 0.2 mm, 0.3 mm, 0.4 mm or 0.5 mm, whereas the maximum of the deflection might e.g. be in the range of 0.1 mm to 20.0 mm or 0.1 mm to 15.0 mm or 0.2 mm to 1.0 mm). If instead a sensor is used wherein the components of the sensor being moved relatively to each other are pivoted relative to each other and wherein the relative pivoting movement generates the measurement signal, the maximum deflection is at least 1° (in particular even at least 1.5° or 2.0° or 2.5° or 3° or 4.0° or 5.0°, wherein it is possible that the maximum deflection is then e.g. in the region of 1° to 10° or 1.5° to 6°). Thus, the maximum deflection of the sensor is in particular at least one magnitude larger than the deflection which is present for force sensors according to the prior art, in particular a strain gauge or a piezo-electric force sensor. Here, the maximum of the effective working force results from the workpieces which have to be worked by the pressing tool, crimping tool or cutting tool. It is also possible that the maximum of the working force is calculated from the maximum of the drive force that can be generated by the drive of the pressing tool, crimping tool or cutting tool (in the case of a drive via hand levers the maximum of the hand force) and from the transmission ratio of the drive mechanism used in the pressing tool, crimping tool or cutting tool. For the example of pressing pliers, crimping pliers or cutting pliers, DIN defines that the maximum of the hand force for a single hand operation of a pressing tool, crimping tool or cutting tool is a hand force of 250 N so that it is possible to determine the maximum working force from a hand force of 250 N which results from the maximum of the hand force of 250 N being effective at the hand levers and a (down-gearing or up-gearing) kinematic of pressing pliers, crimping pliers or cutting pliers. Accordingly, the elastic supporting element is dimensioned such that for the aforementioned maximum of the hand force the deflection of the sensor given above results.

By the inventive use of a comparatively large maximum deflection of the sensor, it is possible to (in some cases significantly) reduce the influence of the aforementioned error sources on the measurement signal of the sensor. Accordingly, for the first time an improved measurement of the working force of the pressing tool, crimping tool or cutting tool is provided.

The components between which the elastic supporting element and the sensor are arranged might be any components in the drive mechanism of the pressing tool, crimping tool or cutting tool. For a particular proposal of the invention, one component is a tool jaw, whereas the other component is a supporting body. For this design, the supporting element and the sensor are arranged directly adjacent a pressing die or crimping die or cutting element. In this way, in some cases the measurement precision can be further increased. On the other hand, in some cases the integration of the supporting element and of the sensor into the surrounding region of the tool jaw is particularly simple and space-saving.

It is possible that within the frame of the invention a tool jaw of the pressing tool, crimping tool or cutting tool is guided for a translatory movement, for a pivoting or any curved path relative to the other tool jaw. The tool jaw can directly form a cutting edge of the cutting tool or a pressing die or crimping die of the pressing tool or crimping tool. However, it is also possible that a cutting edge or a pressing die or crimping die is fixed or mounted to the tool jaw or held exchangeably thereat. Preferably, the tool jaw is coupled to the pressing die or crimping die by a transverse support extending through the crimping die or pressing die. The transverse support is held in a recess of the tool jaw having an open edge of the cross section as being subject of the patent DE 198 02 287 C1 (corresponding to U.S. Pat. No. 6,053,025 A).

For another embodiment of the invention, the tool jaw is supported by a guidance at a supporting body. Here, the guidance provides a remaining measuring degree of freedom, in particular a translatory measuring degree of freedom or any curve-shaped measuring degree of freedom. Here, the guidance might have any constructional design, e.g. in the case of a translatory measuring degree of freedom in the design of a sliding guidance.

For one proposal of the invention, the guidance is a linear guidance. In this case, the remaining measuring degree of freedom is a translatory measuring degree of freedom of the tool jaw relative to the supporting body. To mention only one non-limiting example, it is possible that an inventive design is used for a tool having a drive mechanism corresponding to the drive mechanism of a tool CS 10 or CS 30 of the applicant.

According to another proposal, the guidance is a pivot joint. In this case, the remaining measuring degree of freedom is a pivoting measuring degree of freedom of the tool jaw relative to the supporting body. A provision of the guidance of this type via a pivot joint is possible with a simple constructive design with common embodiments of a pivot joint, in particular with the bearing by a pivot bearing lug and a pivot pin extending through the pivot bearing lug. It is also possible that a pivot bearing is extremely robust.

Here, it is possible that the elastic supporting element and the sensor are arranged with different lever arms or distances from a pivot axis of the pivot joint. By the constructive choice of the length of the different lever arms, it is possible that in the case of the use of the sensor the size of the deflection of the sensor can be influenced by constructive measures. On the other hand, due to the different lever arms or distances it is possible to arrange the supporting element and the sensor with an offset between the tool jaw and the supporting body so that in some cases a particularly compact design results. Here, it is possible that the sensor has a larger lever arm or distance than the supporting element (or vice versa). Preferably, the difference of the two lever arms or distances is larger than the sum of the maximum of the half extensions of the supporting element and the sensor in the direction of the lever arms, in the direction of the distances or in the direction of the main extension of the tool jaw so that it is possible that there is an intermediate space between the supporting element and the sensor.

It is possible that the pivot joint which forms the guidance solely serves for guiding the tool jaw relative to the supporting body. However, for another proposal of the invention it is also possible that the pivot joint (in particular a pivot pin of the same) is multifunctional. In this case, the pivot joint (in particular the pivot pin) also forms a pivot joint for another component as e.g. the other tool jaw, the other component being pivotable relative to the tool jaw which is supported by the supporting element. In this way, a compact design results with a reduced number of components.

It is possible that the tool jaw is mounted to or fixed at the sensor and/or the supporting element. For a particular embodiment of the invention, the tool jaw loosely contacts the sensor and/or the supporting element. This is e.g. of advantage with respect to the tolerances for the manufacturing of the components of the tool and/or for the place where the sensor and/or the supporting element is/are arranged. In some cases also a replacement of the sensor and/or the supporting element or the use of different supporting elements is simplified.

For the loose contact of the tool jaw with the sensor and/or the supporting element the connection between the tool jaw and the sensor and/or the supporting element is established and/or strengthened over the working stroke with the increasing working force by the increasing contact force between the tool jaw and the sensor and/or supporting element corresponding to the increasing working force.

Furthermore, an embodiment of the invention proposes that the tool jaw, the sensor and/or the supporting element is/are biased by a (in some cases pre-tensioned) spring along the measuring degree of freedom. Here, the spring is in particular effective in opening direction of the tool jaw. In the case that the tool jaw loosely contacts the sensor and/or the supporting element, the spring presses the tool jaw against the sensor and/or the supporting element such that a certain pre-tension of the supporting element and/or the bias of the sensor with a base level of a sensor force is provided also when no working force is effective. In some cases, the spring force of the spring is split on the one hand into a spring-supporting force biasing the supporting element and a spring-sensor force biasing the sensor. It is also possible that by the spring a tottering of the tool jaw is reduced or avoided if the tool jaw loosely contacts the sensor and/or the supporting element.

For the design of the elastic supporting element there are a lot of options. Here, the elastic supporting element might comprise one single spring element or also a plurality of spring elements being effective in mechanical series arrangement or mechanical parallel arrangement. Here, it is possible that the elastic supporting element is specifically formed or designed with a linear or non-linear spring stiffness along the measuring degree of freedom which might also be adapted to the characteristic of the effective guidance and/or a characteristic of the sensor.

For a particular proposal of the invention, the elastic supporting element comprises an elastomeric body. By the choice of the geometry of the elastomeric body (in particular the effective cross section transverse to the measuring degree of freedom and the effective length along the measuring degree of freedom) and by the choice of the material of the elastomeric body it is possible to define the stiffness of the elastic supporting element by constructive measures.

For one proposal of the invention, the elastic supporting element comprises a metallic spring body. In order to mention only some non-limiting examples, the metallic spring body might be formed by a leaf spring or bending beam or a spiral spring being biased by compression or pulling.

Another inventive pressing tool, crimping tool or cutting tool comprises a tool head which is immobile over the working stroke. For the design of the tool in a plate construction the tool head might e.g. comprise cover plates. In this case, it is possible that the two tool jaws are guided by a guidance (in particular a common pivot pin or by a linear guide) at the tool head. In this case, the guidance also provides a support of the tool jaw at the supporting body with the remaining measuring degree of freedom. In this case, the force flow of the working force runs from the pivoting jaw over the supporting element and in some cases the sensor to the tool head. Here, the tool head might directly form the supporting body or the supporting body is (or a plurality of separate supporting body parts are) directly or indirectly supported or fixed at the tool head, in particular the cover plates.

Another embodiment of the pressing tool, crimping tool or cutting tool relates to the design of the tool head with at least one cover plate which carries the pivot pin and at which the supporting element is (directly or indirectly via the supporting body) supported. It is also possible that the sensor is supported or held at the cover plate.

A particularly compact design might result if at least one cover plate comprises a recess into which or through which the supporting element and/or the sensor extend/extends. This embodiment is in particular of importance if the extension of the tool head (in particular the outer distance of the two cover plates) in a direction transverse to the pivot plane of the tool jaws is chosen to be smaller than the extensions/extension of the supporting element and/or the sensor in this direction. In this case, it is generally possible to keep the extension of the tool head in this direction small, whereas the supporting element and/or the sensor are/is "nested" with the tool head or the cover plate or at least partially extend/extends through the tool head or the cover plate.

For the design of the sensor the invention in particular proposes two possible variants:

a) It is possible that the sensor is a displacement sensor. Due to the fact that the tool jaw is supported via the supporting elements at the supporting body, dependent on the bias of the tool jaw and so of the supporting element with a crimping force, a pressing force or a cutting force (here also together "working force") a displacement of the tool jaw along the measuring degree of freedom results. This displacement can be sensed by the displacement sensor with a resulting measurement signal. Then, it is possible the convert the measurement signal into the effective working force. The conversion factor here depends on the stiffness of the supporting element (and in the case of a pivoting bearing of the two tool jaws from the distances of the displacement sensor and the elastic supporting element from the pivot axis).

b) Alternatively, it is possible that the sensor is a force sensor. By a mechanical parallel arrangement of the supporting element and the force sensor, a working force biasing the tool jaw can be split on the one hand into a supporting force which biases the elastic supporting element and on the other hand into a sensor force biasing the force sensor. Dependent on the arrangement, geometry and stiffness of the elastic supporting element, in this way it is possible to define the absolute value of the maximum of the sensor force biasing the force sensor by constructive measures. So, it is e.g. possible to keep the sensor force comparatively small over the working stroke when using a comparatively large stiffness of the elastic supporting element. In this way according to an embodiment of the invention it is for the first time possible to use a force sensor of a type for which the person with skill in the art for the here applicable tool without knowledge of the invention assumed that a force sensor of this type would be damaged by a use in a crimping tool, pressing tool or cutting tool due to the high effective working forces. If the same or different tools are used for different dies and/or applications with different maximums of the working forces, by an exchange or by an adaptation of the elastic supporting element and a change of the splitting of the working force into the sensor force and into the supporting force resulting therefrom it is nevertheless possible to use the same force sensors. In order to mention only some non-limiting examples, the supporting force being accommodated by the supporting element might be at least by the factor 10, 20, 50 100 or even 300 larger than the sensor force accommodated by the force sensor.

In the case that it is of interest to avoid that the force sensor is biased by excess sensor forces which might lead to a damaging of the force sensor, an embodiment of the invention proposes that the pressing tool, crimping tool or cutting tool comprises a limiting device. By the limiting device the sensor force biasing the force sensor is limited. For the design of the limiting device there are a lot of options. It is e.g. possible that for a certain movement of the tool jaw along the measuring degree of freedom with the coinciding elastic bias of the elastic supporting element the tool jaw abuts a stop (e.g. a stop of the supporting body or the tool head). Due to the contact with the stop, a further increase of the working force leads to the result that another force component of the working force is supported by the stop. In the case of a rigid stop, the stop limits the sensor force to the sensor force being effective at the point in time when the tool jaw initially contacts the stop. If instead the stop is elastic, the elastically supported stop provides an additional supporting spring which is arranged in parallel arrangement to the elastic support by the supporting element. Another possible option for a design of a limiting device might be the use of a slipping clutch. The slipping clutch might e.g. be effective in the force flow between the force sensor and/or the supporting element and the tool jaw and/or the supporting body such that with a slipping of the slipping clutch when exceeding a predetermined threshold value of the working force the force sensor is not further biased with a sensor force. However, it is also possible that the slipping clutch is integrated into the drive mechanism of the pressing tool, crimping tool or cutting tool such that the actuation forces of the pressing tool, crimping tool or cutting tool are limited and indirectly also the sensor force is limited. One example of a limiting device of this type is e.g. described in the publication EP 2 826 598 B1. A very simple limiting device can be provided if the elastic supporting element has a design and is dimensioned such that when reaching the maximum of the supporting force the elastic supporting element establishes a full contact or blocking contact such that a further deformation is not possible and a further increase of the working force does not lead to an increase of the sensor force but only to an increase of the supporting force.

Within the frame of the invention, it is generally possible to use any force sensor. For one particular proposal of the invention, the force sensor comprises an elastic sensor body. To mention only some non-limiting examples, the elastic sensor body might be an elastomeric body formed as a hemisphere or calotte, as a half cylinder or with any other shape. The sensor body forms a contact surface or a contact area with a sensor surface of the force sensor. If the sensor force biases the elastic sensor body, this leads to an elastic deformation of the sensor body coinciding with a change of the size of the contact area between the elastic sensor body and the sensor surface. Here, the size of the contact area depends on the sensor force biasing the force sensor with a given dependency. Then, the force sensor determines the size of the contact area and converts the determined size of the contact area (in particular by the aforementioned given dependency, a characteristic map, a calibration curve or any a-priori given conversion function) into a force measurement signal.

For the type of the determination of the size of the contact area in the force sensor, any measurement principle might be used. It is e.g. possible that a transition resistance between the elastic sensor body and the contact surface which depends on the size of the contact area is evaluated. It is also possible that the sensor surface of the force sensor comprises a series or matrix of contacts or switches. So, a lot of small contacts or switches can be provided at the sensor surface which are switched by the contact with the elastic sensor body. Wth an increase of the contact area of the sensor body with the sensor surface, more contacts or switches are closed so that by the termination of the number of actuated contacts or switches it is possible to determine the contact area (and so the sensor force). Here, it is possible that only the sensor surface is electrified. In this case, the switches of the sensor surface are actuated by the elastic sensor body. However, it is also possible that a series or matrix of contacts is provided in the sensor surface. In this case, also the elastic sensor body is electrified. If the elastic sensor body comes into contact with a contact of the sensor surface, an electrical connection is established which is then evaluated. By the number of the established electrical contacts or actuated switches determined in this way which depends on the size of the contact area, it is possible to determine the sensor force. Within the frame of the invention, a one-dimensional series or a two-dimensional matrix (even or curved in space) of contacts or switches can be used. In the case of the use of a two-dimensional matrix with switches or contacts, the number of actuated contacts or switches approximately correlates with the size of the contact area. Instead, when using a one-dimensional series of contacts or switches, a representative extension of the contact area (e.g. the diameter of a circular contact area or one dimension of an elliptic contact area along a half axis) is analyzed.

In this context it is possible that within the frame of the invention for the first time for the design of the force sensor a design according to the publication DE 102 28 185 A1 (corresponding to U.S. Pat. No. 7,534,973 B2) is used, the publication generally relating to a sensor for a technological field differing from tools:

The publication DE 102 28 185 A1 discloses an input sensor which is manually actuated by a finger. The input sensor is removably arranged on a touchscreen or at a housing of a Palm computer or of a smartphone. An input sensor of this type might e.g. be used as a kind of small joystick or so-called trackpoint for controlling a mouse curser. The input sensor proposed in DE 102 28 185 A1 comprises an input plate or an input button actuated against a spring by the finger. On the lower side, the input plate comprises a calotte which is pressed against a contact matrix dependent on the input force applied by the finger upon the input plate. Dependent on the input force, the contact area between the calotte and the contact matrix changes. The calotte comprises an electrically conducting contact coating on the side facing towards the contact matrix. Dependent on the input force and the size of the contact area, the number of the contacts established between the contact coating of the calotte and the contact matrix changes. Wth the determination of the number of the closed contacts then the effective input force can be determined. If the input plate is not only moved by a translatory movement vertical to the contact matrix and not only elastically supported in this direction, from a deflection of the contact surface between the contact matrix and the contact coating a pivoting of the input plate can be determined so that the input sensor can also be used as a kind of pivot switch. The contact matrix consists of a plurality of electric single contacts having a series contact arrangement which can be applied upon a base plate being designed as a circuit board. If the calotte itself is manufactured from an electrically conductive material, it is possible not to use a contact coating. By the choice of the size and the stiffness of the calotte it is possible to define the sensitivity of the input sensor with respect to the input force applied by the finger. It is also possible that the contact matrix comprises conductive paths having a grid-like design. Here, for a large number of contact points it is possible that conductive paths extend in different electrically separated planes. As an alternative to a contact coating of the calotte or to the electrically conductive design of the calotte, it is possible that between the input plate and the conductive paths a polyester-dome sheet is arranged which on the one hand fulfils the function of an elastic support of the input plate and on the other hand with a conductive coating of the lower side (e.g. of carbon, metal and the like) fulfils the function of the contact medium. A resolution of the sensed input force can be influenced by the choice of the number of matrix elements of the contact matrix. The disclosure of the publication DE 102 28 185 A1 is incorporated by reference to the disclosure of the present patent application.

For another embodiment of the invention, the pressing tool, crimping tool or cutting tool comprises an electronic control unit for analyzing the measurement signal of the sensor. Here, it is possible that the electronic control unit cooperates with other electrical or electronic components, e.g.

- a binary or stepped display or diodes which indicate if a progression of the sensor force or the sensor displacement or a maximum of the sensor force or a maximum of the sensor displacement (within predefined limits) concurs with the ideal progression or an ideal maximum,
- a continuous notification or a display for displaying a curve or a representative value of the working force or sensor force or the sensor displacement,
- a storage unit for storing and for the later documentation of the progression of the working force during a working stroke and the like.

In a further embodiment of the invention, the electronic control unit comprises control logic. The control logic determines the force measurement signal from an electric contact area signal correlating to the size of the contact area under consideration of a calibration factor, a calibration curve or a characteristic map or under consideration of a dependency of the size of the contact area from the sensor force biasing the force sensor, under consideration of a lever arm of the sensor force, under consideration of a spring characteristic of the elastic supporting element and/or under consideration of a lever arm of the supporting force. Here, the calibration factor, the calibration curve or the characteristic map, the dependency, the lever arms and/or the spring characteristic can be known a-priori and/or can be stored in a permanent storage unit associated with the electronic control unit. However, it is also possible that (in the factory or by the user for the first time of use, during a repair or in any post-calibration interval) the calibration factor, the calibration curve or the characteristic map, the dependency, the lever arms and/or the spring characteristic are "learned" or are input via the electronic control unit.

For another proposal of the invention, the electronic control unit comprises control logic by which it is possible to calibrate the tool for working processes. On the basis of the control logic, the following steps can be executed:

a) At first, an execution of a calibration working stroke or of a plurality of calibration working strokes is initiated. The tool can e.g. comprise a button or switch being accessible from the outside or a wireless or wired device. With the actuation of the device it is possible to initiate the execution of the calibration working strokes. It is possible that this initializing is performed in the factory of the manufacturer or the initializing is performed by a customer or the user of the tool. Furthermore, the calibration can be initiated in order to execute a first calibration or a post-calibration of the tool independent on the intended use. However, it is also possible that an individual calibration of the tool is performed for a specific intended use which is then preferably done by the customer or user of the tool. If e.g. with the tool for a specific intended use a specific type of plug has to be crimped to a specific type of cable, after the initiation a plurality of calibration working strokes can be executed with a plurality of samples of this type of plug and this type of cable. After the execution of the calibration, then it is possible to crimp this type of plug with the associated type of cable with this tool. If then for a later point in time the tool has to be used for plugs and/or cables of different types, a new calibration has to be initiated and executed.

b) If a calibration as explained above has been initiated, a calibration working stroke or a plurality of calibration working strokes is executed. Here, the measurement signals of the sensor are sensed. If the calibration working strokes have been executed according to the specifications, representative measurement signals are available on the basis of which then for the subsequent use of the tool a monitoring of the execution of working strokes according to the specifications can be provided. For the example mentioned under a) these representative measurement signals are the force signals and displacement signals which occur when crimping the mentioned type of plug with the associated type of a cable according to the specifications.

c) From the measurement signals recorded during the calibration working strokes then representative data, a calibration factor, a calibration curve, a characteristic map and/or representative fluctuations can be determined from a plurality of measurement signals. For the example mentioned under a), b), as a representative value e.g. the maximum or a mean value of the maxima of the measurement signals can be determined and used. It is also possible that additional to the maximum of the measurement signals or a mean value of the respective maxima the fluctuation width of the maximum for the plurality of calibration working strokes is determined. It is e.g. possible that when using the tool for crimping specific types of plugs and cables by means of calibration working strokes it has been determined that the maximum of the measurement signals is in a range of 95% to 105% of a characteristic value. In order to mention only some non-limiting example, the representative data might also be an increasing slope of the measurement signal with time or the increasing slope of the measurement signal dependent on the displacement signal which correlates to the movement of the hand levers of the tool during the working stroke or correlates to the movement of a drive element being in driving connection with the hand lever.

d) Under use of the representative data, the calibration factor, the calibration curve, the characteristic map and/or the representative fluctuations, then an evaluation of the quality of working processes with the tool after terminating the calibration is performed. If for the aforementioned example after the calibration the tool is used for crimping and during the working stroke only a maximum of the measurement signal of 90% or 110% is reached, an indicator is available that the quality of the performed working process is not sufficient.

It is also possible that dependent on the manufacturing tolerances for a plurality of tools having the same design the absolute value of the measurement signal differs for ideally the same calibration working strokes. When using a relative deviation of a maximum during a working process from the maximum of the specific tool during the calibration working strokes as explained above, a reliable evaluation of the quality of the working process independent on the manufacturing tolerances and independent from the different absolute values of the measurement signals resulting therefrom can be performed.

The result of the aforementioned analysis can be used in a plurality of ways. In order to mention only one non-limiting example, e.g. a warning lamp or diode might signal to the user that the quality of the performed working process is unsatisfactory. It is also possible that the result of the analysis is stored so that it is possible to read the result at a later point in time and/or to use the result for the purpose of documentation.

Another solution of the object underlying the invention is given by a tool group. The tool group comprises at least one first pressing tool, crimping tool or cutting tool and at least one second pressing tool, crimping tool or cutting tool. Here, the first and second pressing tools, crimping tools or cutting tools have a design as described above. However, the first and second pressing tools, crimping tools or cutting tools are pressing tools, crimping tools or cutting tools of different types and/or for different maxima of the working forces. According to an embodiment of the invention, the first pressing tool, crimping tool or cutting tool on the one hand and the second pressing tool, crimping tool or cutting tool on the other hand have the same sensors but differing supporting elements. In this case, it is possible to achieve a high number of the same components due to the use of the same sensors despite of the different types of the pressing tools, crimping tools or cutting tools and/or the different maxima of the working forces. This can be provided by using different supporting elements which in particular differ with respect to the effective stiffnesses.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

FIG. 9 shows a detail IX of the force sensor according to FIG. 7.

FIG. 16 in a three-dimensional view shows a pressing tool, crimping tool or cutting tool wherein a supporting element extends through a recess of a cover plate of the tool head.

DETAILED DESCRIPTION

Figure 1:
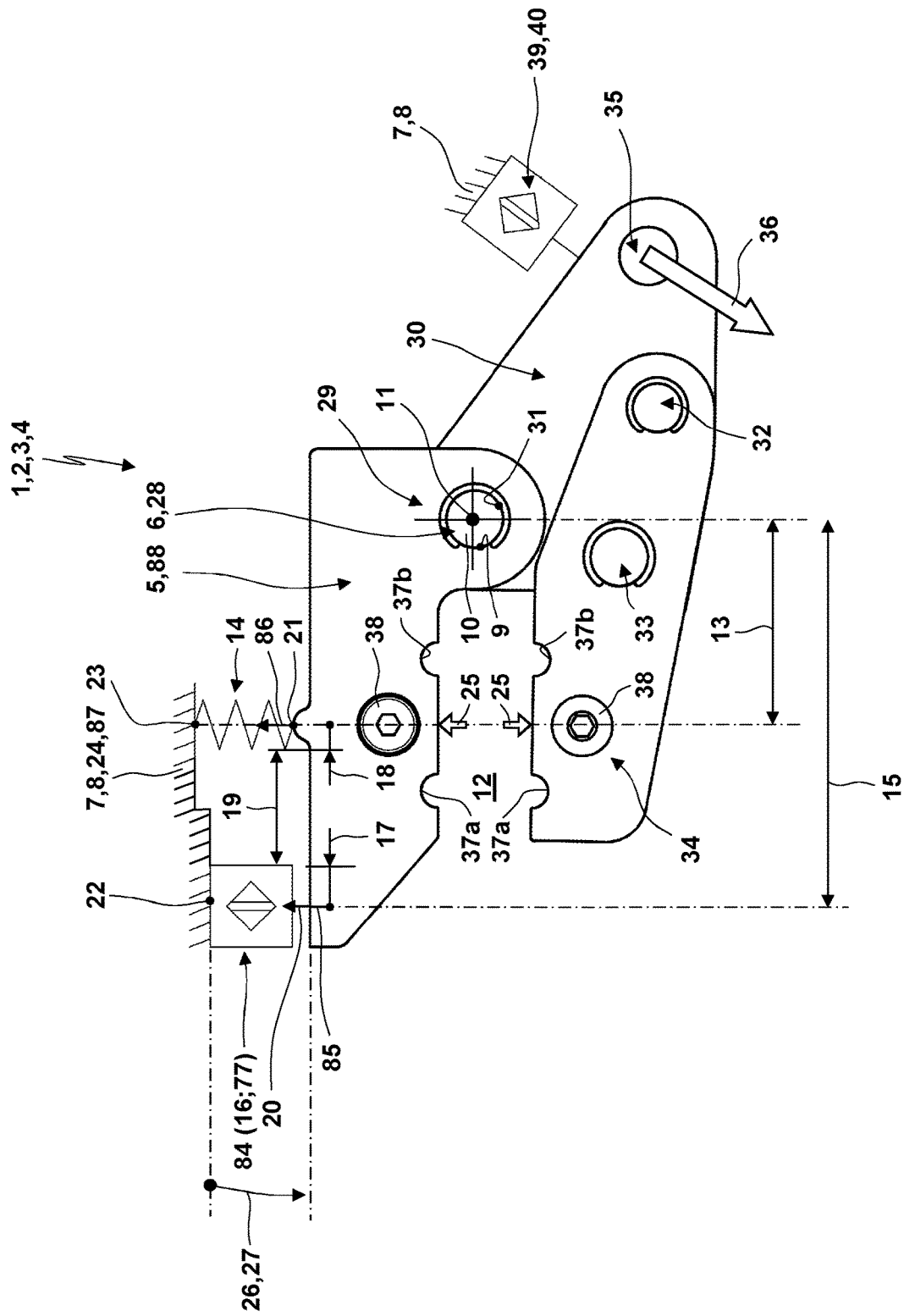
FIG. 1 schematically shows a part of a pressing tool, crimping tool or cutting tool comprising a tool jaw which is supported by a force sensor with an elastic supporting element in parallel arrangement (here with a pivoting degree of freedom of the tool jaw and a pivoting measuring degree of freedom).

In the following description reference is made to a sensor with the reference numeral 84. The sensor 84 might be a force sensor 16 or a displacement sensor 77. Preferably, in the description reference is made to the embodiment of the sensor 84 as a force sensor 16. However, the corresponding also applies for the design of the sensor 84 as a displacement sensor 77.

FIG. 1 very schematically shows a principle sketch of a pressing tool 1, crimping tool 2 or a cutting tool 3 which is in the following for the scope of simplification also denoted as tool 4. The tool 4 comprises a tool jaw 5. The tool jaw 5 is supported for being pivoted relative to a tool head 7 (in particular a cover plate 8 or a machine frame) by a pivot joint 6. For the shown embodiment the pivot joint 6 comprises a bearing lug 9 of the tool jaw 5 and a pivot pin 10 which extends through the bearing lug 9. Here, in an end region the pivot pin 10 or also both end regions are held at the tool head 7, in particular in bores of two cover plates 8. It is possible to pivot the tool jaw 5 about a pivot axis 11 defined by the pivot pin 10 relative to the tool head 7.

On a side facing away from a die accommodation or workpiece accommodation 12 the tool jaw 5 is supported with a lever arm or distance 13 from the pivot axis 11 by an elastic supporting element 14. Furthermore, on the side facing away from the die accommodation or workpiece accommodation 12 the tool jaw 5 is supported with a lever arm 15 by a sensor 84, in particular a force sensor 16. If instead of the force sensor 16 a displacement sensor 77 is used, the displacement sensor 77 has a corresponding distance 15. In this case, preferably the displacement sensor 77 does not provide a support additional to the support by the supporting element 14. For the shown embodiment the lever arm 15 is larger than the lever arm 13. Preferably, the difference of the lever arms 15, 13 is larger than the sum of the half of the extension 17 of the force sensor 16 and the half of the extension 18 of the elastic supporting element 14 in the direction of the lever arms 15, 16 so that there is an intermediate space 19 between the force sensor 16 and the elastic supporting element 14.

A base 20, 21 of the force sensor 16 respectively of the elastic supporting element 14 interacts with the tool jaw 5 whereas the opposite bases 22, 23 of the force sensor 16 respectively of the elastic supporting element 14 are supported at a supporting body 24 which is supported at the tool head 7 or directly formed by the same. The force sensor 16 comprises an own elasticity. The bias of the tool jaw 5 over the working stroke of the tool 4 with a working force 25 leads to a splitting of the working force 25 corresponding to the lever arms 13, 15 into a sensor force biasing the force sensor 16 as well as into a supporting force biasing the elastic supporting element 14. Due to the limited stiffness of the elastic supporting element 14 and the force sensor 16, a change of the distance between the tool jaw 5 and the supporting body 24 results. This is the case due to a relative movement of the tool jaw 5 and the supporting body 24 corresponding to the measuring degree of freedom 26 which for the shown embodiment is a relative pivoting measuring degree of freedom 27 about the pivot joint 6. The relative movement along the pivoting measuring degree of freedom 27 is guided by a guidance 28 which for the shown embodiment is the pivot joint 6. The relative movement leads to a deflection 85 of the force sensor 16 and a deflection 86 of the elastic supporting element 14.

An actuation lever 30 is supported for being pivoted by a pivot joint 29 at the tool head 7. For the shown embodiment, the pivot joint 29 comprises a bearing lug 31 of the actuation lever 30 and the pivot pin 10 which extends through the bearing lug 31. By two mounting bolts 32, 33 another tool jaw 34 is mounted to the actuation lever 30. The pivot joints 6, 29 as well as on the one hand the tool jaw 5 and on the other hand the actuation lever 30 as well as the tool jaw 34 have the same pivot axis 11 defined by the pivot pin 10. Distant from the pivot axis 11 the actuation lever 30 comprises a linkage 35 by which it is possible to apply an actuation force 36 upon the actuation lever 30. Here, it is possible to generate the actuation force 36 manually by hand levers and a generally known drive connection interposed between the linkage 35 and the hand levers or by an electric, hydraulic or pneumatic drive, in some cases also with an interposed drive mechanism (which also covers a drive transmission).

The actuation force 36 aims to pivot the two tool jaws 5, 34 towards each other. If a workpiece is arranged between the tool jaws 5, 34 (in particular between cutting edges or dies carried by the tool jaws 5, 35), the workpiece is cut or severed, pressed or crimped due to the actuation force 36. Due to the working force 25 applied to the tool jaws 5, 34, there is a relative movement of the tool jaw 5 relative to the supporting body 24 along the pivoting measuring degree of freedom 25 which coincides with the generation of a sensor force and supporting force increasing with the further relative movement.

Preferably, during the working stroke the pivoting movement of the tool jaw 5 is smaller than the pivoting movement of the tool jaw 34 by a factor being larger than 5, 10, 20, 50 or even 100. For the embodiment according to the prior art wherein the tool jaw 5 does not comprise a measuring degree of freedom 26, the tool jaw 5 is also denoted as "fixed tool jaw", whereas the tool jaw 34 is denoted as "movable tool jaw". For the shown embodiment, in a scissors-like fashion the tool jaws 5, 34 are pivoted about the same pivot axis 11. Preferably, FIG. 1 shows a parallel orientation of the pivot jaws 5, 34 of the tool 4 at the end of the working stroke without this necessarily being the case. Within the frame of the invention, there are also embodiments wherein the tool jaw 34 is pivoted by the drive about a pivot axis which has a distance from the pivot axis 11.

Generally, it is possible that the tool jaws 5, 34 directly form the cutting edges or pressing dies or crimping dies. However, for the shown embodiment the tool jaws 5, 34 are coupled to exchangeable pressing dies or crimping dies by two transverse supports extending through the pressing die or crimping die which are accommodated with a close fit in recesses 37a, 37b of the tool jaws 5, 34 having the shape of a half cylinder and a cross section with an open edge and a mounting screw 38 which extends through aligned bores of the tool jaws 5, 34 and the pressing dies or crimping dies.

(Concerning the coupling, cp. the further details in the disclosure of patent DE 198 02 287 C1).

For the shown embodiment the tool jaw 5 is L-shaped or angled. The pivot joint 6 is arranged in an end region of a leg of the L, whereas the pressing die or crimping die is supported at the other leg of the L. At the opposite side of the other leg of the L the support is provided via the force sensor 16 and the elastic supporting element 14 at the supporting body 24.

Optionally, it is possible that another sensor 39 is present which for the shown embodiment is a displacement sensor 40. The displacement sensor 40 senses the displacement of the actuation lever 30 during its pivoting movement in a predetermined distance from the pivot axis 11. From the sensed displacement it is possible to calculate the displacement of the tool jaws 34 corresponding to the drive characteristic of the drive mechanism. If both a displacement signal of the displacement sensor 40 as well as a force signal of the force sensor 16 are available, it is possible to determine a force-displacement progression during a working stroke of the tool 4. Generally, it is possible that the sensor 39 is embodied as an angular sensor which senses the pivoting angle over the working stroke. Furthermore, it is possible that a sensor 39 being embodied as a displacement sensor 40 directly senses the stroke of a component of the drive mechanism, in particular a linear stroke of a tool jaw.

For a modified embodiment it is also possible that the tool jaw 5 is directly supported at the tool head 7, whereas the guidance 28, the elastic supporting element 14 and the force sensor 16 are integrated into the force flow between the drive mechanism and the tool jaw 34 in such a way that by the guidance 28 a measuring degree of freedom 26 is defined. Along the measuring degree of freedom 26 the elastic supporting element 14 and the force sensor 16 (arranged in mechanical parallel arrangement) can be biased with a sensor force and a supporting force which correlate with the actuation force being effective in the force flow.

Furthermore, the invention might be used for tools wherein by any drive a "movable" tool jaw can be moved translatory relative to the other "fixed" tool jaw. In order to mention only a non-limiting example, reference is made to crimping pliers of the applicant with the labels CS 10, CSV 10, CS 30. In this case, the guidance, the force sensor and the elastic supporting element might be arranged and be effective between a tool head or frame and the initially "fixed tool jaw" which then is movable along the measuring degree of freedom under the bias of the force sensor and the supporting element or be integrated into the force flow of the drive mechanism of the "movable" tool jaw.

Figure 2:
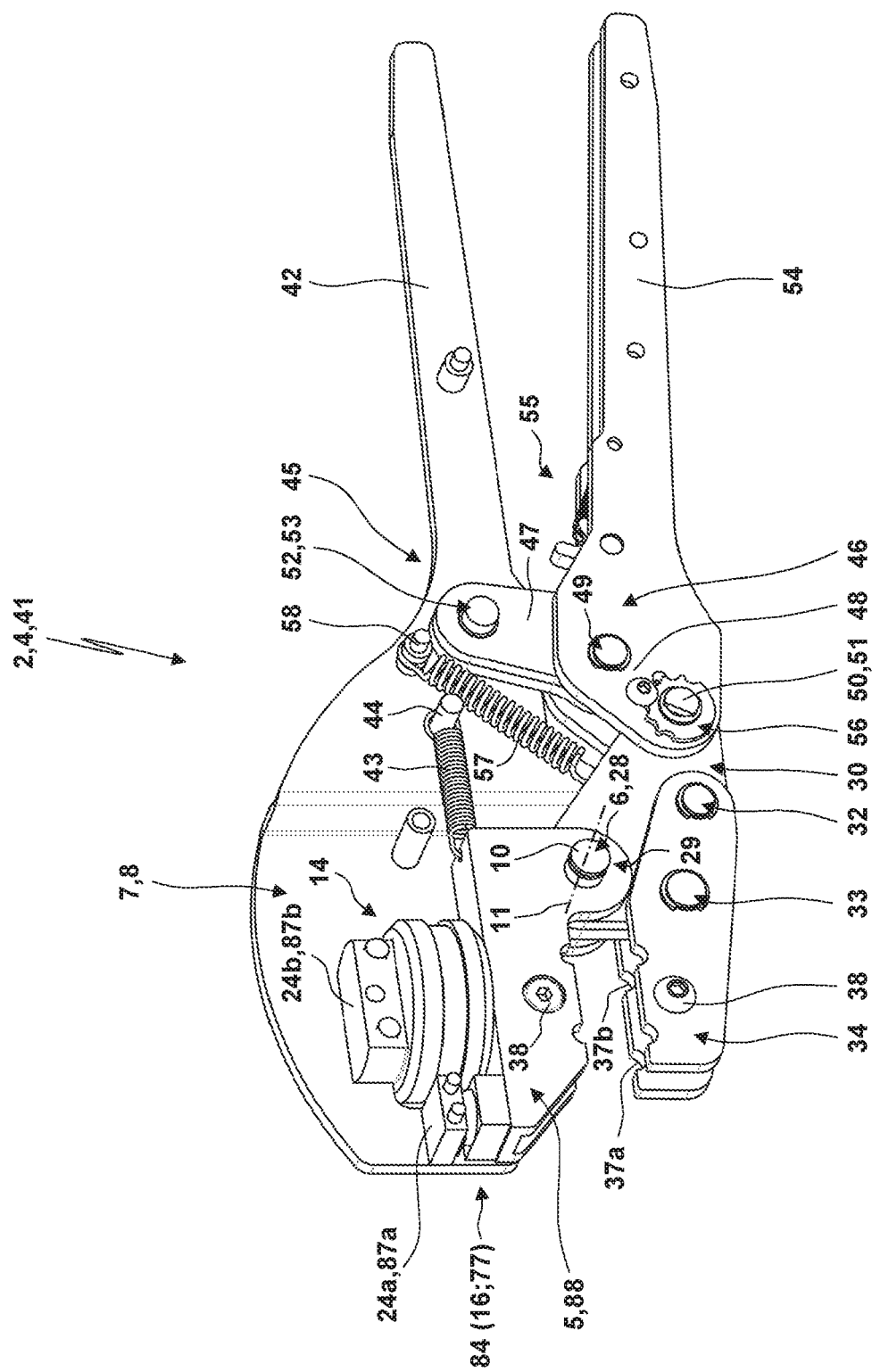
FIG. 2 shows a constructive design of a manually actuated pressing tool, crimping tool or cutting tool in a three-dimensional partly disassembled representation.
Figure 8:
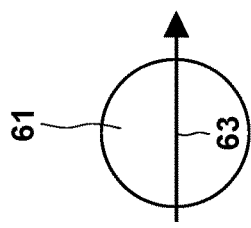
FIGS. 4, 6, 8 show the resulting different contact areas between a sensor surface and an elastic sensor body of the force sensor for the different sensor forces according to FIGS. 3, 5 and 7.

FIG. 2 shows a part of a tool 4 embodied as a crimping tool 2 which is here embodied as manually actuated crimping pliers 41. The tool head 7 comprises a cover plate 8 which forms one piece with a hand lever 42 of the crimping pliers 41. The tool jaw 5, the tool jaw 34, the actuation lever 30 (being coupled to each other and designed according to FIG. 1) are supported for being pivoted about the pivot axis 11 by the pivot pin 10 at the tool head. Plate-like or block-like supporting body parts 24a, 24b for supporting the elastic supporting element 14 as well as the sensor 84 (in particular the force sensor 16) are fixed at the tool head 7, in particular by welding or screwing. The tool jaw 5 loosely contacts the side of the supporting element 14 as well as of the force sensor 16 which faces away from the supporting body parts 24a, 24b. The tool jaw 5 is biased in opening direction by a pre-tensioned spring 43. For the shown embodiment, the spring 43 is embodied as spiral-shaped pulling spring. However, also other embodiments of the spring 43 are possible. One spring base of the spring 43 is linked with a distance from the pivot axis 11 to the tool jaw 5 whereas the other spring base is linked to a bolt 44 which is fixed to the tool head 7. Accordingly, also when not crimping a workpiece between the tool jaws 5, 34 the elastic supporting element 14 and the force sensor 16 are biased by a supporting force and a sensor force which depend on the pre-tension of the spring 43.

FIG. 2 shows also a possible drive mechanism 45 by which it is possible to generate an actuation force 36 biasing the linkage 35 of the actuation lever 30. For this purpose, a toggle lever drive 46 is used. The toggle lever drive 46 comprises toggle levers 47, 48. The toggle levers 47, 48 are connected for being pivoted to each other by a toggle joint 49. The end region of the toggle lever 48 facing away from the toggle joint 49 is linked by a pivot joint 50 (which here comprises a pivot pin 51) to the linkage 35 of the actuation lever 30. The end region of the toggle lever 47 facing away from the toggle joint 49 is linked by a pivot joint 52 (here a pivot pin 53) to the tool head 7. In the extended position of the toggle lever drive 46 the toggle levers 47, 48 have an orientation approximately vertical to the connecting axis between the pivot joint 50 and the pivot joint 6. However, preferably the toggle lever drive 46 when approaching the closed position of the tool jaws 5, 34 is in a position with a short distance from the extended position without the extended position being passed during the working stroke.

A movable hand lever 54 is formed as one piece with the toggle lever 48. Wth the pivoting movement of the hand levers 42, 54 towards each other the toggle lever drive 46 moves towards its extended position which coincides with the generation of an actuation force 36 which is directed in closing direction of the tool jaws 5, 34. In per se known fashion, the crimping pliers 41 might comprise a forced locking unit 55 which secures a reached closed position of the hand levers 42, 54 as well as of the tool jaws 5, 34 when not completing the working stroke and provides the option of an opening of the hand levers 42, 54 as well as of the tool jaws 5, 34 only when having completely run through the working stroke. Furthermore (in particular in the region of the connection of the toggle lever 47 with the actuation lever 30) an adjusting device 56 might be present by which a (fine) adjustment of the closed position of the tool jaws 5, 34 is possible.

FIG. 2 shows that essential parts of the crimping pliers 41 have been manufactured in a plate construction. Here, FIG. 2 shows a plate which forms both the tool head 7 with a cover plate 8 as well as a part of the hand lever 42. In FIG. 2 a corresponding cover plate arranged on the other side has been disassembled. The hand lever 54 with the toggle lever 48 is here formed with two parallel plates between which two toggle levers 47 (being formed with two plates directly lying upon each other) and the actuation lever 30 are accommodated. Also the tool jaw 34 is formed with two plates being spaced apart from each other. The plates extend on both sides of the actuation lever 30. Instead, the tool jaw 5 is preferably a massive component which (as can be seen in FIG. 2) might comprise a slot or recess on the underside wherein a web of a die can be housed.

For the embodiment according to FIG. 2, the crimping pliers 41 are biased in opening direction by a spring 57. For the shown embodiment, a spring base of the spring 57 is linked to a bolt 48 carried by the tool head 7 whereas the other spring base of the spring 57 is linked to the actuation lever 30.

A corresponding construction can also be chosen for the design of a pressing tool or a cutting tool or also for pressing pliers or cutting pliers.

Figure 3:
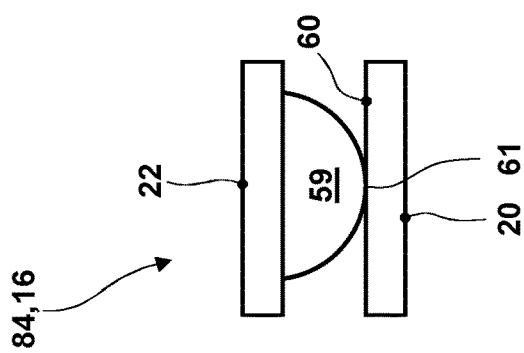

FIG. 3 shows a possible embodiment of a force sensor 16 being usable within the frame of the invention. The force sensor 16 comprises an elastic sensor body 59 which might e.g. be an elastomeric body. The elastic sensor body 59 is fixedly connected to the base 22 of the force sensor 16. In the direction towards the base 20 the elastic sensor body 59 has a cambered or convex shape. The elastic sensor body 59 might be embodied as a calotte or have a semi-spherical or partly spherical shape or might be semi-cylindrical or partly cylindrical (to mention only some non-limiting examples). The elastic sensor body 59 and the sensor surface 60 form a contact area 61. The geometry of the contact area 61 depends on the shape of the sensor body. The contact area might e.g. be circular, elliptic or rectangular.

Figure 4:

FIG. 4 shows the contact area in a plan view. Without a working force 25 being applied, the contact area 61 is very small. Preferably, the small contact area 61 without applied working force 25 results from the small elastic deformation of the elastic supporting element 14 and the elastic sensor body 59 due to the bias by the spring 43.

FIGS. 5 to 8 show the changing conditions when running through the working stroke. Wth an increase of the effective sensor force 62, the contact area 61 increases according to a dependency which depends on the lever conditions as well as on the stiffnesses of the elastic supporting element 14 and the force sensor 16 (here in particular the elastic sensor body 59). For the person with skill, it is obvious that dependent on the geometry of the elastic sensor body 59 and any contour of the sensor surface 60 contact areas 61 might result which are not circular as being the case in FIGS. 4, 6 and 8 but have any other geometry, e.g. an elliptic geometry, a rectangular geometry for a partly cylindrical elastic sensor body 59 and the like.

Figure 7:
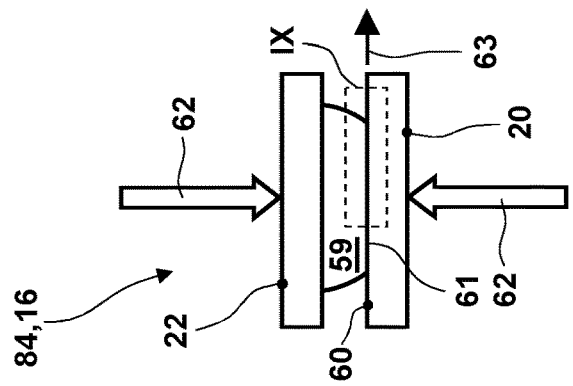
FIGS. 3, 5, 7 in a side view show a force sensor with different biasing sensor forces.
Figure 6:
Figure 5:
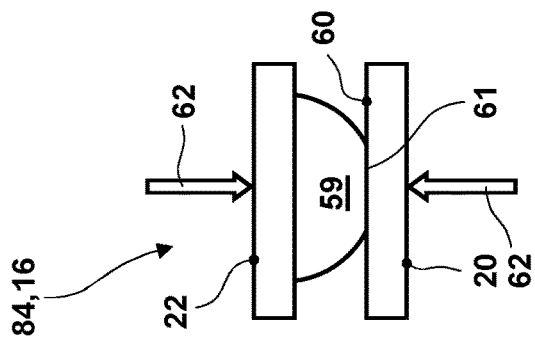

By the force sensor 16 the sensor force 62 is preferably determined by determining the size of the contact area 61. This might (as explained in the beginning) e.g. be done by measuring the transition resistance which depends on the size of the contact area 61. Preferably, here a technology is used which has been described in another technical field in the publication DE 102 28 185 A1:

FIG. 9 shows a detail IX of the force sensor according to FIG. 7 in the region of the contact area 61. It can be seen that the sensor surface 60 at least in a direction of extension 63 comprises a series 64 of switches or contacts 65a, 65b, 65c, . . . being arranged with constant or varying distances. The series 64 and the direction of extension 63 might e.g. have an orientation in the direction of a diameter of the contact area 61 or a semi-axis e.g. of an elliptical contact area 61 or a direction of extension 63 of a rectangular contact area. The number of switches or contacts 65 which establish a contact with the elastic sensor body 59 depends on the size of the contact area 61 and so also on the size of the sensor force 62. If the number of the switches or contacts 65 being contacted by the elastic sensor body 59 is determined in an electronic fashion, from this number it is possible to determine the sensor force 62 (and so the working force 25). In the case that switches 65 are used, by a contact of the sensor body 59 with the respective switches 35 the generally open switches 65 are closed so that current passes the switch which can be analyzed for detecting that this switch has been contacted. However, it is also possible that contacts 56 are used which are then contacted by the sensor body 59 which is in some cases subjected to a current so that with the contact current flows over the respective contact 56. The contact current can then be analyzed for detecting which and what number of contacts 56 have established an electric contact with the sensor body 59.

Figure 10:
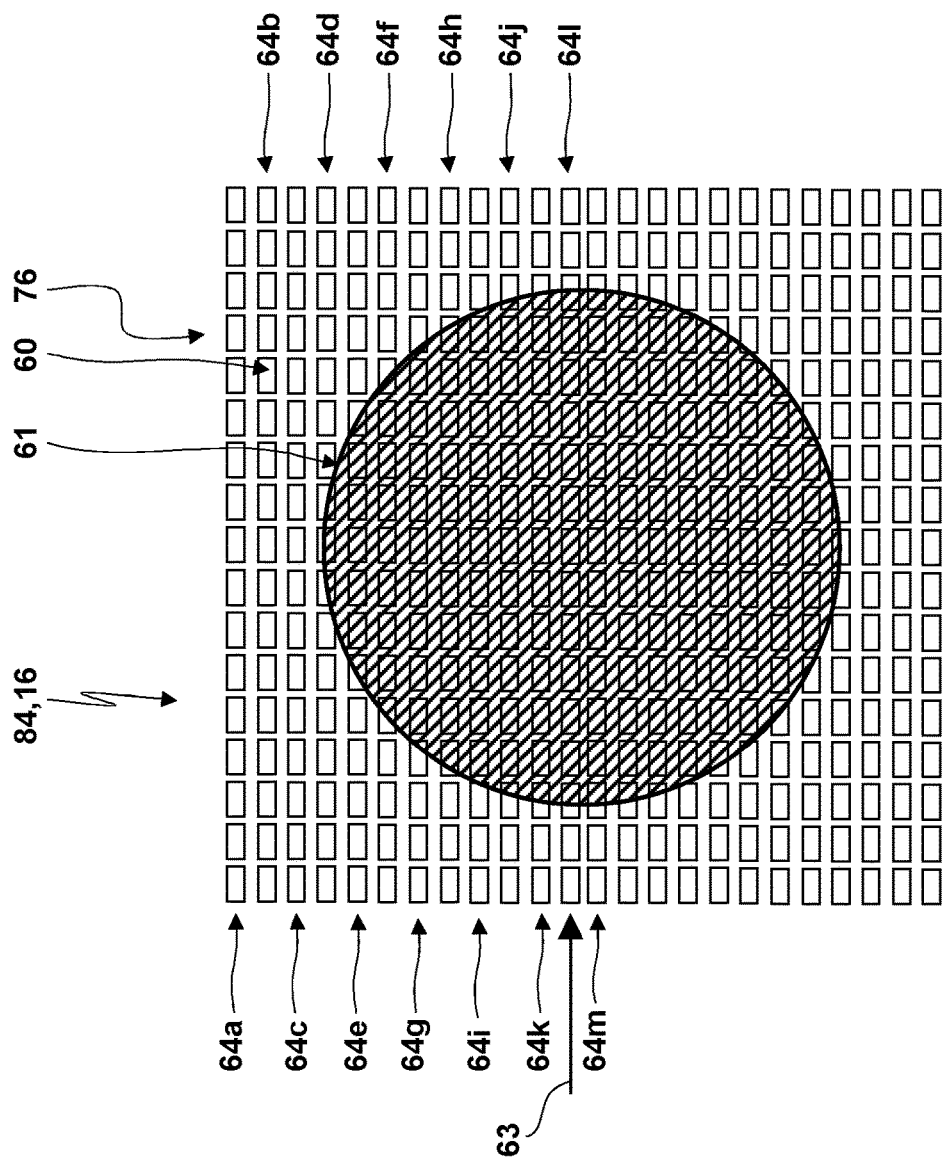
FIG. 10 in a plan view shows a contact area of an elastic sensor body contacting a sensor surface of the force sensor which is embodied as a matrix of contacts or switches.

FIG. 10 shows a modified embodiment with a plan view of the contact area 61 and the sensor surface 60. Here, the sensor surface 60 not only comprises a series 64 of switches or contacts 65 but instead a plurality of series 64a, 64b, 64c, . . . arranged one besides another so that here the switches or contacts 65 are arranged in a kind of matrix 76. If here the number of contacts or switches 65 which are contacted by the elastic sensor body 59 is analyzed in a corresponding way, this number directly correlates to the area of the contact area 61.

(For the purpose of clarification, it is indicated that for the use of only one series of switches or contacts 65 only one single series 64 in the representation according to FIG. 10 is used which is arranged in the region of the diameter of the formed contact area 61, whereas the other series shown in FIG. 10 are not present.)

Figure 11:
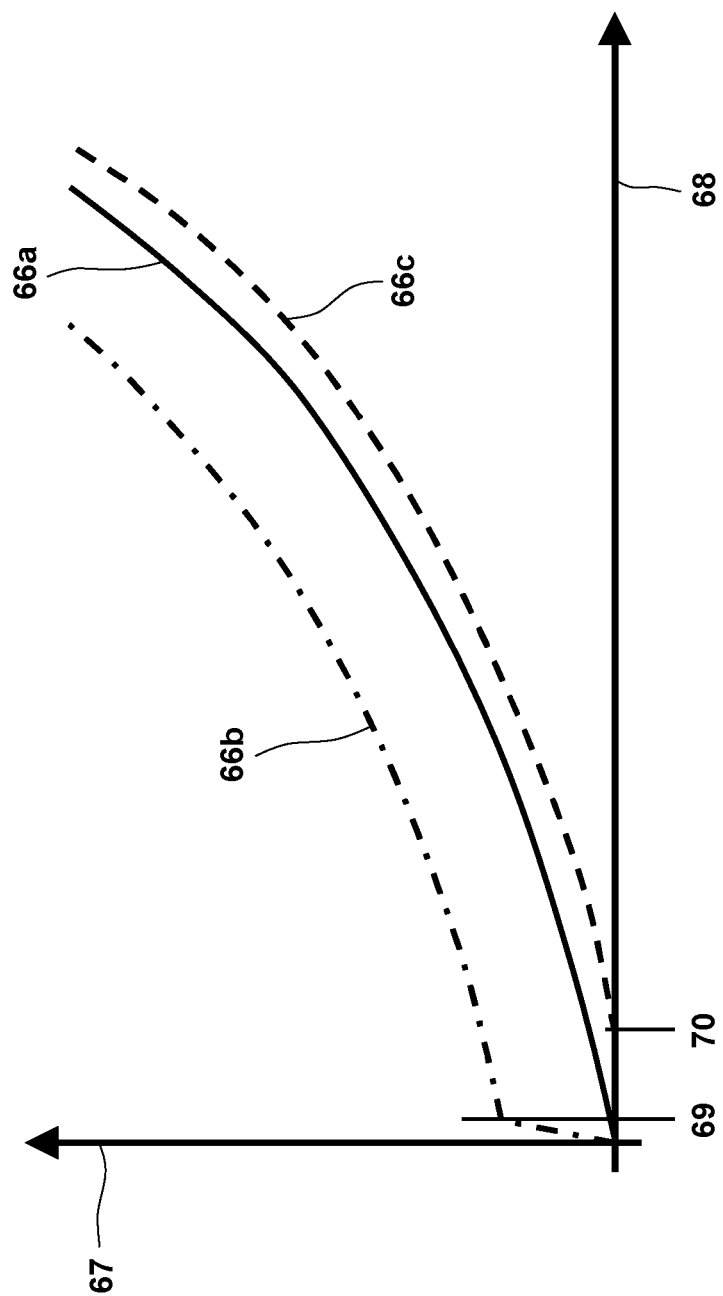
FIG. 11 schematically shows different characteristic curves of force sensors, e.g. for different assembly conditions and/or tolerances.

FIG. 11 shows a curve 66 of a sensor force 67 determined by the force sensor 16 over the working stroke 68 of the tool 4. Here, the curve 66a shown with solid line shows the ideal curve. Here, it is possible to convert the sensor force 67 under consideration of the characteristic of the deformation of the elastic supporting element 14 into the effective working force 55. It is also possible that corresponding to the characteristic of the force sensor 16 or the elastic sensor body 59 as well as the geometry of the elastic sensor body 59 the number of actuated contacts or switches 65 is converted into the effective sensor force 67. In each case it is possible to determine the effective working force 55 on the basis of the curve 66 over the working stroke 68.

The curves 66b, 66c show the sensor force 67 over the working stroke 68 for a not-ideal curve or process. So, the curve 66b e.g. shows a curve or process for which due to manufacturing tolerances (e.g. of the elastic supporting element 14) the force sensor 16 is biased at the beginning of the working stroke without a parallel bias of the elastic supporting element 14. Accordingly, up to a working stroke 69 there is no parallel bias of the supporting element 14 and the force sensor 16. As a consequence, the sensor force determined by the force sensor 16 has a very steep slope. When reaching the working stroke 69, then also the elastic supporting element 14 is biased so that the tool jaw 5 is supported in a parallel fashion both by the force sensor 16 as well as by the supporting element 14. Accordingly, generally the curve 66*b* for working strokes being larger than the working stroke 69 comprises a curvature corresponding to the ideal curve 66*a* with a shift which results from the steep slope up to the working stroke 69.

Instead, the curve 66*c* shows the progression of the sensor force 67 for the case that (also due to manufacturing tolerances) at the beginning of the working stroke only the elastic supporting element 14 is biased whereas up to a working stroke 70 there is no bias of the force sensor. With a sufficient deformation of the supporting element 14 when reaching the working stroke 70 the supporting element 14 and the force sensor 16 are cumulatively biased so that then the curve 66 generally corresponds to the curvature according to the ideal curve 66*a*, however with the shift which results from the start of the biasing of the force sensor 16 only with the arrival at the working stroke 70. For error sources differing from manufacturing tolerances of the elastic supporting element 14, corresponding shifts result.

Preferably, according to one embodiment of the invention the tool 4 comprises a control unit by which a calibration is performed such that despite of the explained inaccuracies (in particular manufacturing tolerances) non-ideal curves 66*b*, 66*c* of a sensed sensor force 67 are shifted in such a way that these correspond to the ideal curve 66*a* or at least approximate the same. For the execution of a calibration of this type, there are different options:

It is e.g. possible that a workpiece or a reference specimen which for the actuation of the tool 4 leads to a predetermined working force 25 (and so the predetermined sensor force 67) is inserted into the tool 4. For a tool 4 with the ideal curve 66*a* the force sensor 16 with the associated control unit in fact determines the predetermined sensor force, whereas for a tool 4 with the curve 66*b* a sensor force being too high will be determined, and for the tool 4 with the curve 66*c* a sensor force being too small will be determined. Then, a correction can be provided with the addition of a sensor force correction value or the subtraction of a corresponding sensor force correction value leading to a shift of the curves 66*b*, 66*c* towards the ideal curve 66*a*.

Figure 12:
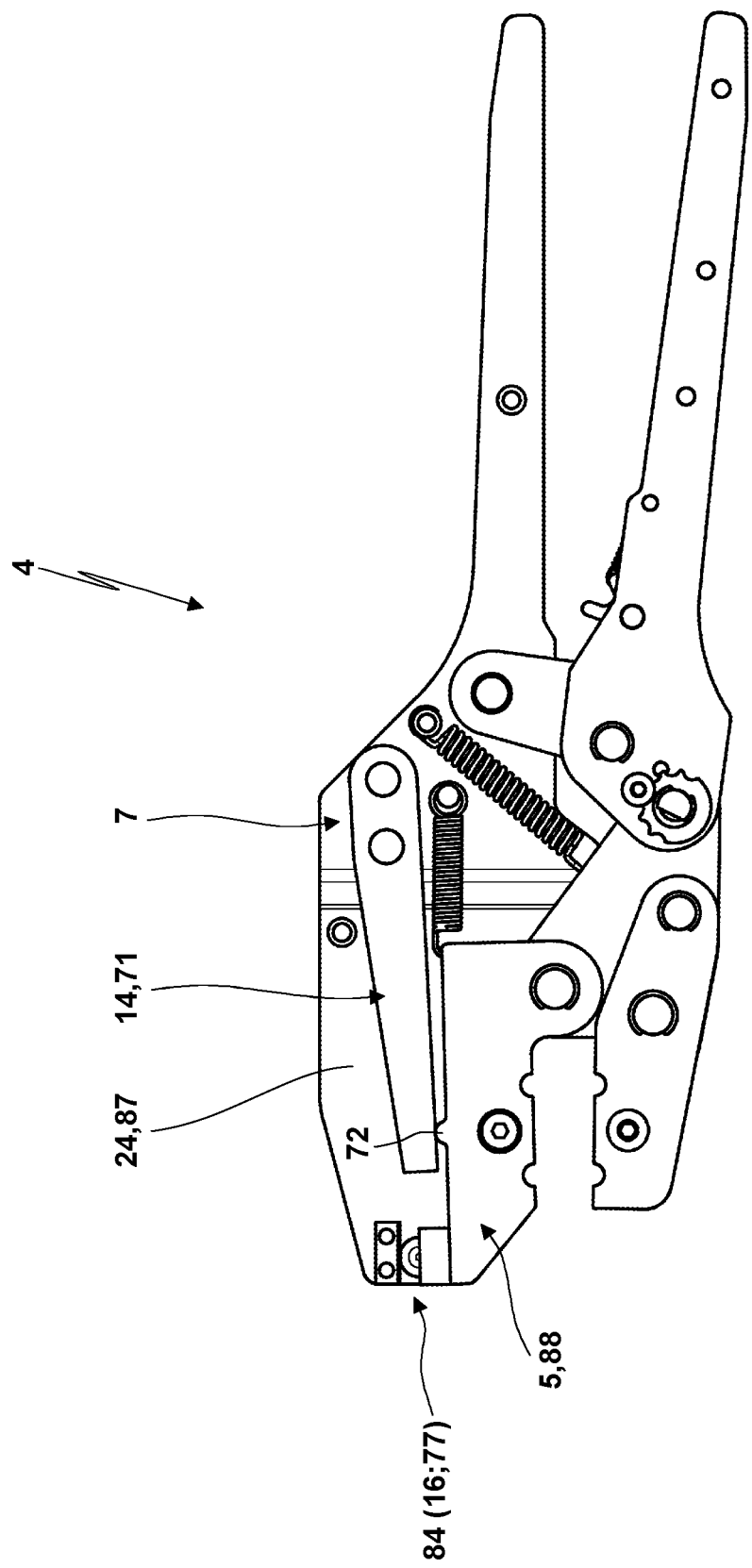
FIGS. 12 to 15 show pressing tools, crimping tools or cutting tools with different elastic supporting elements.

Whereas according to FIG. 2 the elastic supporting element 14 is a can-shaped or ton-shaped or cylindrical elastomeric body (in particular made of a PU material), FIG. 12 shows an embodiment wherein the elastic supporting element 14 is a leaf spring or bending beam 71. An end region of the leas spring or bending beam 71 is fixed to the tool head 7 or the cover plates of the same (e.g. by two mounting bolts), whereas at the freely protruding end region a protrusion 72 of the tool jaw 5 is supported.

Figure 13:
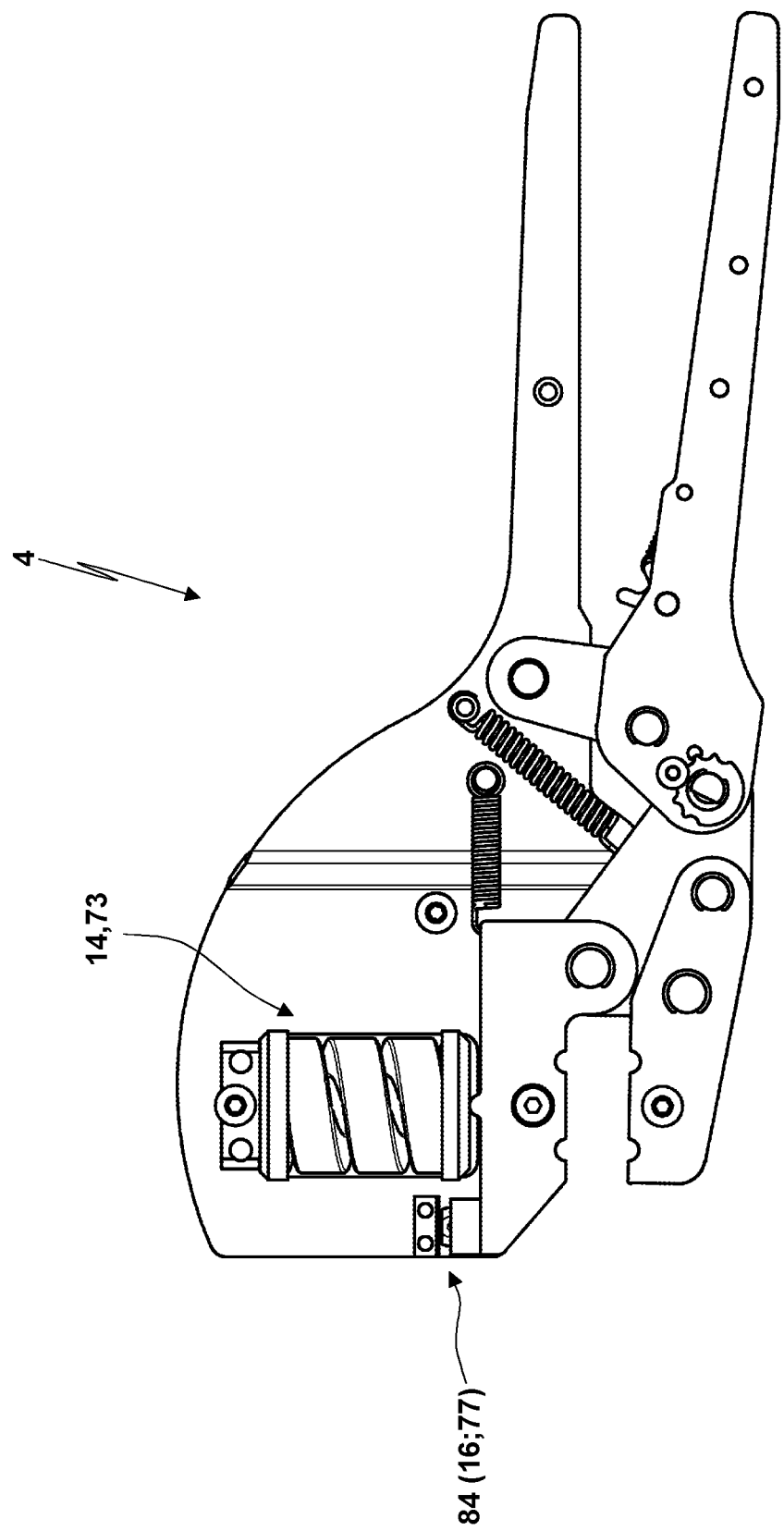

For the embodiment shown in FIG. 13, the elastic supporting element 14 is a spiral-shaped compression spring 73.

Figure 14:
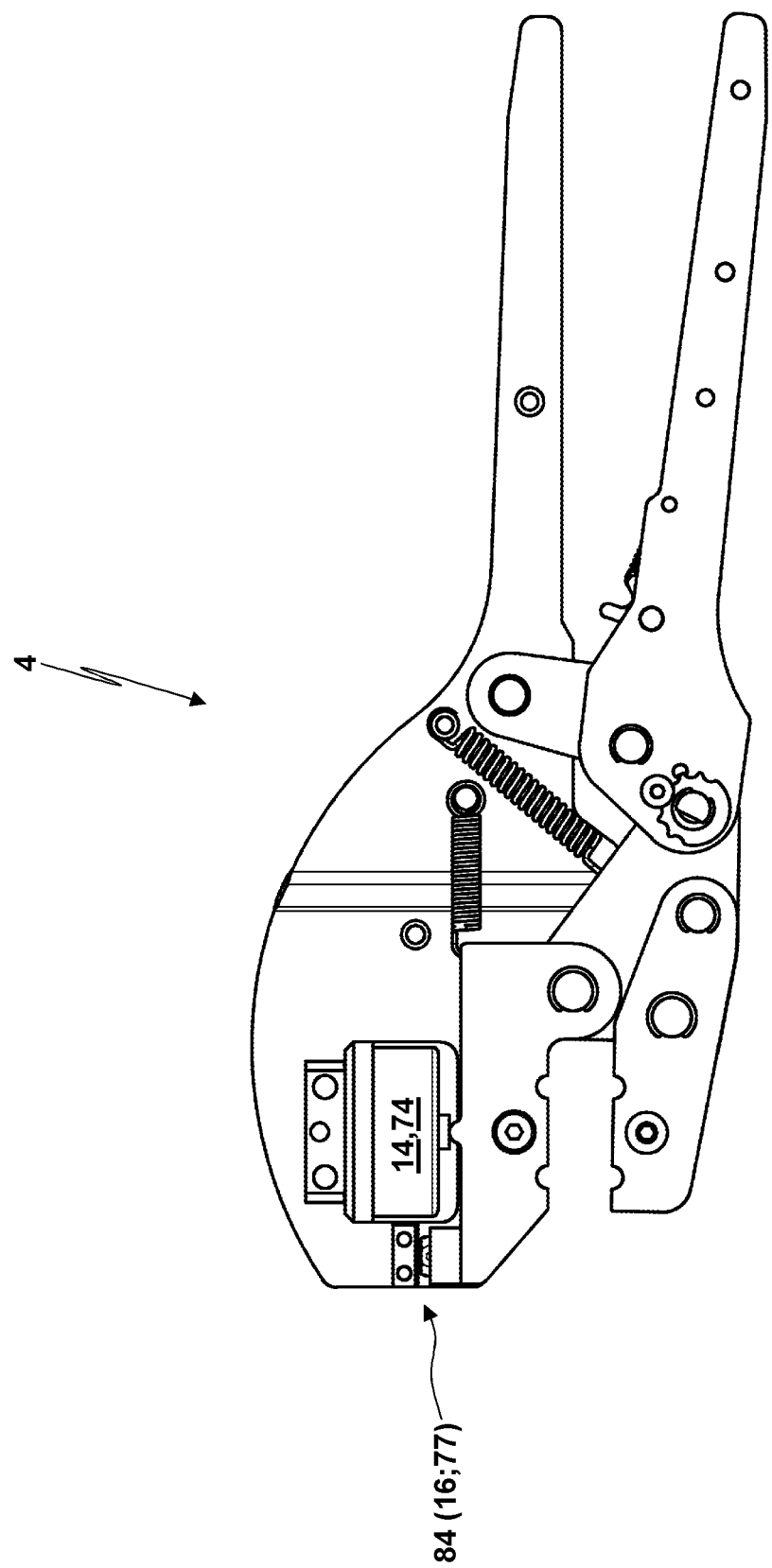

However, it is also possible that according to the embodiment shown in FIG. 14 the elastic supporting element 14 is a gas-pressurized spring 74.

Figure 15:
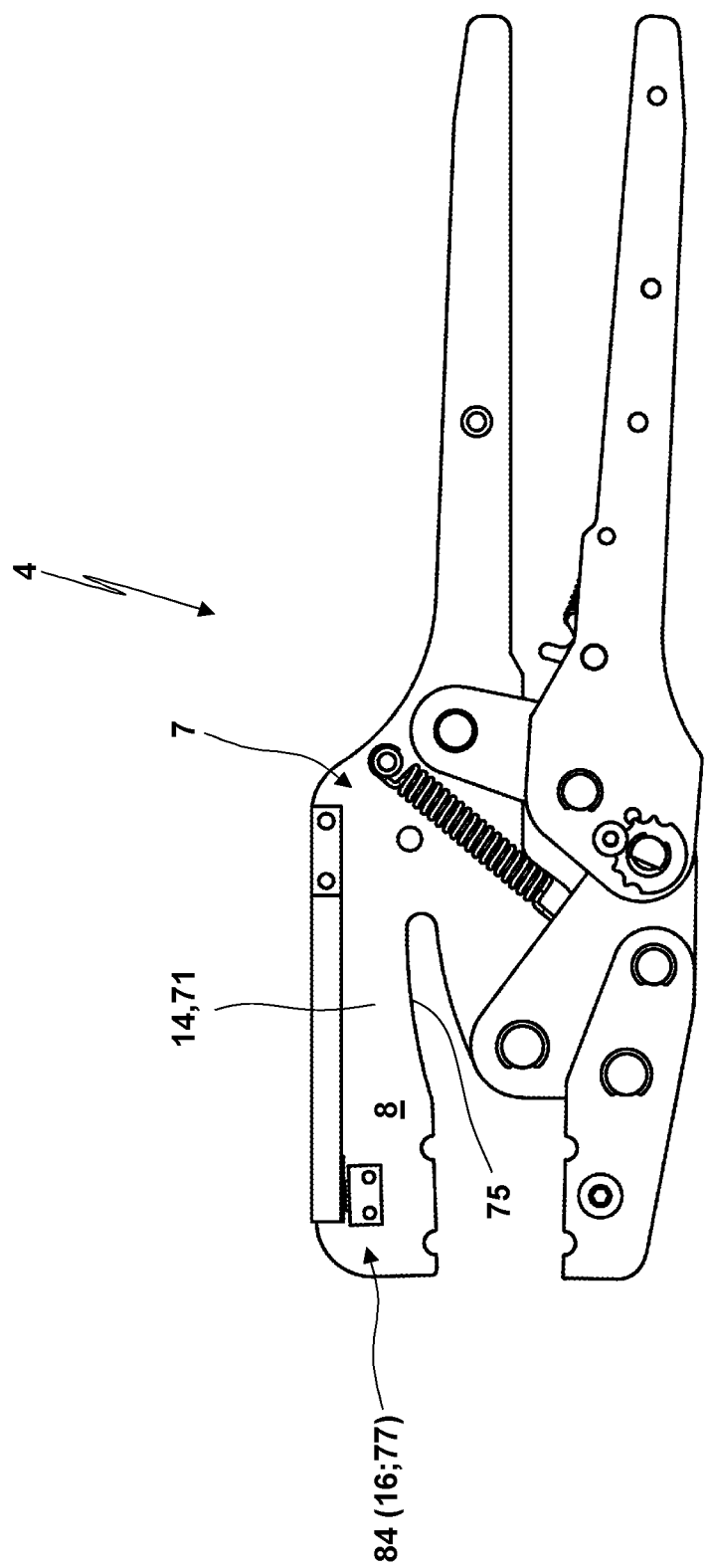

In order to mention another non-limiting example, according to FIG. 15 it is also possible to specifically design the cover plate 8 of the tool head 7 with an elasticity. In this case, the tool head 7 or the cover plate 8 itself forms the elastic supporting element 14. For the embodiment shown in FIG. 15, the cover plate 8 comprises a recess or cut-out forming a weakening of the cover plate 8 so that the cover plate 8 forms a kind of leaf spring or bending beam 71. The free end region of the leaf spring or bending beam 71 can be used for supporting a die.

As can be seen from FIG. 16, it is generally possible that the tool head 7 (here the cover plates 8) comprise a recess 80 or window into which or through which the supporting element 14 and/or the force sensor 16 or displacement sensor 77 extend/extends.

By means of a limiting device 81 it is possible to limit the movement of the tool jaw 5 along the measuring degree of freedom 26 or to limit the sensor force biasing the force sensor 16.

Figure 17:
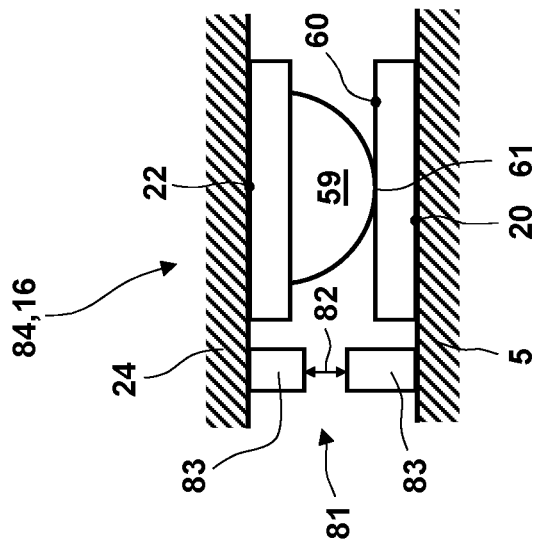
FIG. 17 schematically shows a force sensor with integrated limiting device for the sensor stroke of the force sensor.

For the embodiment according to FIG. 17, the limiting device 81 forms an integral component of the force sensor 16. The limiting device 81 defines a maximum sensor stroke 82. The limiting device 81 comprises at least one stop 83 which blocks a further sensor movement of the force sensor 16 (and also a further movement of the tool jaw 5) when reaching the maximum sensor stroke 81.

Figure 18:
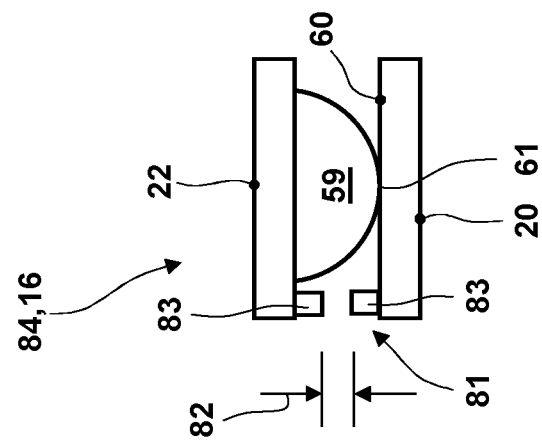
FIG. 18 schematically shows a limiting device being effective between the tool jaw and the supporting body or tool head in the neighborhood of a force sensor.

For the embodiment according to FIG. 18, the limiting device 81 does not form an integral component of the force sensor 16. Instead, here the limiting device 81 is directly effective between the tool jaw 5 and the supporting body 24.

A corresponding limiting device 81 might also be used for the design of the sensor 84 as a displacement sensor 77 if the displacement sensor 77 only has a limited measurement region.

Figure 19:
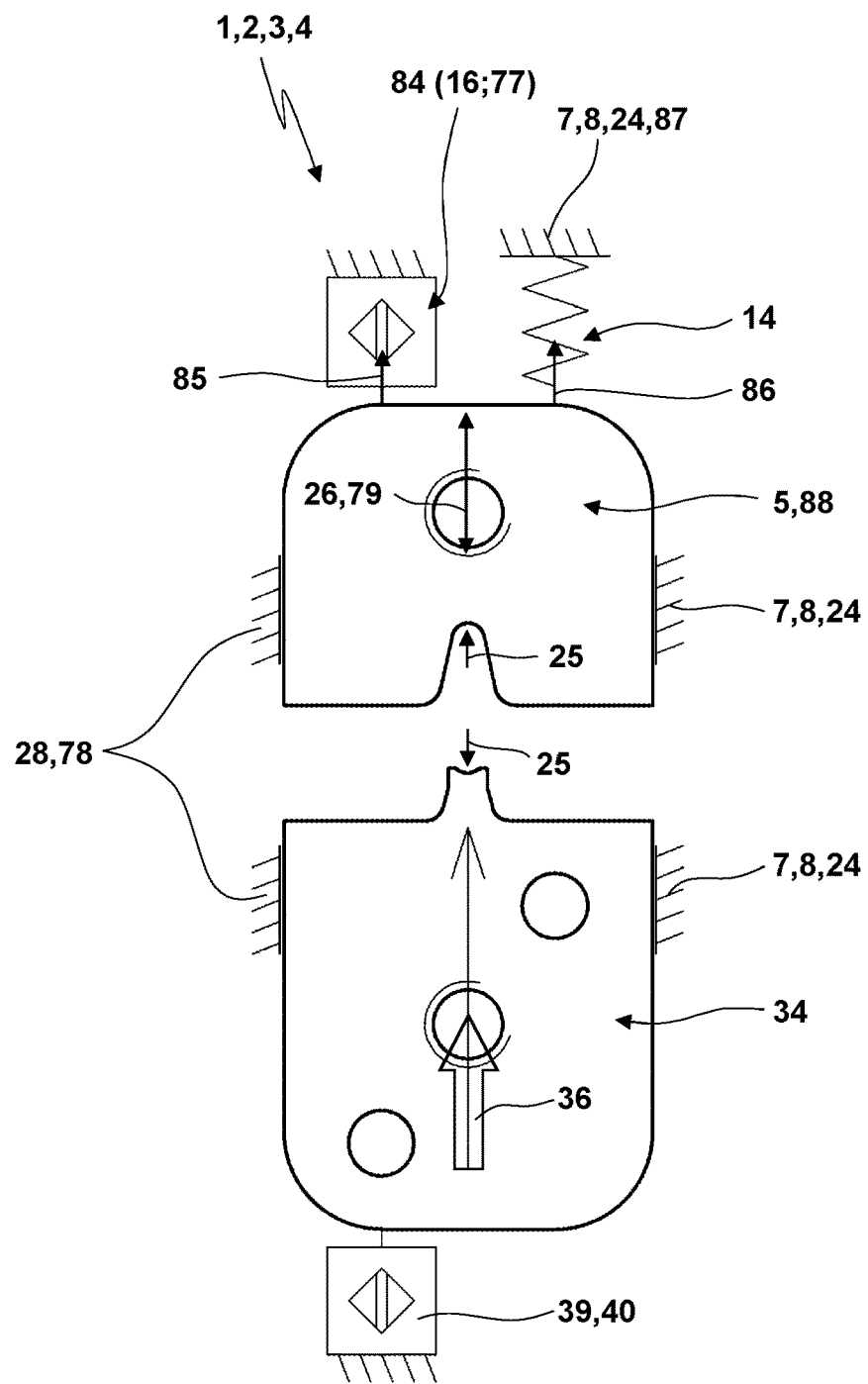
FIG. 19 in a schematic view shows a part of a pressing tool, crimping tool or cutting tool comprising a tool jaw which is supported by a force sensor with an elastic supporting element in parallel arrangement (here with a translatory degree of freedom of the tool jaw and a translatory measuring degree of freedom).

FIG. 19 shows a schematic representation of a tool 4 wherein the tool jaws 5, 34 are guided by a linear guidance 78 for a translatory relative movement. A tool 4 of this type might e.g. be designed as crimping pliers of the applicant with the label CS 10 or CS 30. Here, the tool jaw 34 is biased by a drive (in particular hand levers with an associated drive mechanism) with an actuation force 36 and moved along the linear guidance 78 towards the tool jaw 5. On the side facing away from the tool jaw 34, the tool jaw 5 is supported by a sensor 84 (in particular a force sensor 16) and in mechanical parallel arrangement by a supporting element 14. The linear guidance 78 defines a linear measuring degree of freedom 79. Dependent on the working force 25 biasing the tool jaw 5, under the bias of both the supporting element 14 as well as of the force sensor 16 the tool jaw 5 is moved along the measuring degree of freedom 79. Also here it is optionally possible that additionally a displacement of the tool jaw 34 (or of a drive element being in driving connection therewith) is sensed by a displacement sensor 40 in order to determine a force-displacement-curve with the force sensor 16 and the displacement sensor 40.

Preferably, the inventive pressing tool, crimping tool or cutting tool is embodied as pressing tool, crimping tool or cutting tool manually actuated by two hand levers.

Within the frame of the invention, the sensor 84 and the elastic supporting element 14 are arranged in mechanical parallel connection between two components 87, 88 which are arranged in the force flow of the pressing tool, crimping tool or cutting tool 1, 2, 3. Here, the two components 87, 88 are arranged in mechanical series arrangement. It is possible that the two components 87, 88 are biased by the working force of the pressing tool, crimping tool or cutting tool 1, 2, 3. However, it is also possible that the two components 87, 88 are only biased by a defined portion of the working force of the pressing tool, crimping tool or cutting tool 1, 2, 3. The components 87, 88 can be arranged at any position in the drive mechanism of the pressing tool, crimping tool or cutting tool 1, 2, 3 between a drive (in particular hand levers) and a tool jaw 5 (including the same). In this case, it is also possible that the working force biasing the components 87, 88 is geared-up or geared-down due to the drive mechanism with respect to the force generated by the drive and/or biasing the tool jaw 5. However, it is also possible (as being the case for the embodiments shown here) that the components 87, 88 are integrated into the support of the "fixed pliers jaw 5" (which in this case is not really fixed to the associated fixed hand lever 42 but is displaced or pivoted relative to the hand lever 42 according to the displacement or pivoting movement of the supporting element 14 and of the sensor 84.

It is possible that the two components 87, 88 are only coupled to each other by at least one elastic supporting element 14 and the sensor 84. However, preferably the two components 87, 88 are additionally coupled to each other by a guidance 28 which is e.g. a linear guidance or a pivot joint.

The components 87, 88 can each be embodied as one-pieces or multi-pieces. For a multi-piece design the parts can (directly or indirectly) be rigidly connected to each other. Here, it is generally possible that a component 87, 88 consists of at least two parts. In this case, the elastic supporting element 14 is supported at one part and the sensor 84 is supported at another part. In this case, it is even possible that the two parts are not (directly or indirectly) rigidly connected to each other over the working stroke but the parts are able to execute a defined relative movement which depends on the working stroke and which is predetermined by the drive mechanism.

For the embodiments shown here, the components 87, 88 are embodied as tool jaw 5 and supporting body 24 without the invention being limited to this design.

The sensor 84 and the elastic supporting element 14 are deflected with deflections 85, 86 correlating to each other. In the case of a guidance of the components 87, 88 relative to each other by a pivot joint 29, the deflections 85, 86 correlate according to the distances 13, 15 from the pivot axis 11 of the pivot joint 29 (cp. FIG. 1). Instead, in the case of a guidance of the components 87, 88 relative to each other by a linear guidance 78 the deflections 85, 86 correlate to each other by being the same (cp. FIG. 19).

Without this necessarily being the case, the pivot joint 6 providing the guidance 28 might be multifunctional by forming also the pivot joint 29 for another component (in particular the other tool jaw 34 or an actuation lever 30). Here, the other component can be pivoted relative to the tool jaw 5 which supports the supporting element 14.

The embodiment of the sensor 84 shown in FIGS. 3 to 10 is only one example of a force sensor 16 being usable within the frame of the invention. Without a restriction of the invention to the following further embodiments of a sensor 84 being intended, in particular sensors 84 basing on the following principle might be used:

It is possible to use a capacitive displacement sensor. Here it is possible that a capacitive displacement sensor senses a relative movement of two circuits boards. In this case, the circuit boards might comprise one couple or a plurality of couples of rows of electrodes wherein the rows of electrodes each comprise a plurality of electrodes being arranged with constant distances and being commonly electrically biased. The rows of electrodes are biased by a test signal. A sensed transfer function between the rows of electrodes which depends on the relative positions of the circuit boards and the associated couples of rows of electrodes is analyzed in order to sense the displacement which correlates to the relative movement of the circuit boards. A possible embodiment of a capacitive displacement sensor of this type is e.g. described in the publication U.S. Pat. No. 4,879,508 A. The disclosure of this publication is incorporated by reference into the present patent application with respect to the technical design of a capacitive displacement sensor.

It is possible that a potentiometer or a sheet-potentiometer is used as displacement sensor. It is e.g. possible that sheet-potentiometers are used which are described on the website www.metallux.de and which are distributed under the label "Foliensensor linear MTP-L", "Foliensensor linear MTP-LX" or "Foliensensor Wegerfassung kontaktlos magnetisch MMP".

Furthermore, it is possible that an optical displacement sensor is used. An optical displacement sensor of this type might e.g. comprise measurement rods made of glass which might comprise a BCD-coding. Examples of usable optical displacement sensors are e.g. described by and distributed via the website www.keyence.de as "photoelectric sensors" or "fiber-optical sensors", cp. also the patent applications and patents of the company Keyence Corporation, Osaka, Japan which have been classified in the IPC classification G01D005.

Also the use of an inductive displacement sensor is possible.

Possible is also the use of a mechanical displacement sensor wherein e.g. a pointer or needle of the displacement sensor is moved with the working stroke and which remains at the end of the working stroke at the reached position so that the maximum value of the working force is displayed. It is also possible that when exceeding a threshold value the mechanical displacement sensor actuates a mechanical counter so that the mechanical counter is able to display the number of passed working strokes of a tool.

Furthermore, it is possible that a magnetic sensor or a Hall-sensor is used. These sensors might be used in any design. It is possible that only a distance of a magnet from a sensor for detecting the magnetic field is changed so that it is possible to sense a displacement on the basis of a sensed change of the magnetic field. For another embodiment it is also possible that a magnetic strip comprises an alternating permanent magnetic field over its longitudinal extension. The magnetic strip is then moved relative to a receiver for the magnetic field. Options of displacement sensors of this type can e.g. be taken from the website www.ams.com/eng/products/magnetic-position-sensors under the heading "Linear position". A Hall-sensor of the type AS5510 as distributed under this heading can e.g. be used.

It is also possible that a displacement sensor is used wherein a shadowing element is moved between a light emitter and a light receiver (e.g. a photo-transistor and an LED). Dependent on the deflection of the displacement sensor, the extent of the shadowing of the light path from the light source to the light receiver changes. The shadowing element might be a slider, a shadowing window and the like. It is also possible that e.g. a foamed material or another partially light translucent material is arranged between the light emitter and the light receiver, the foamed material or the partially light translucent material being compressed more or less dependent on the displacement of the displacement sensor which leads to the change of the translucence.

It is possible that a laser-based displacement sensor is used.

It is possible that a sensor is used wherein the displacement path is digitized with at least 100 steps. However, it is also possible that the digitization comprises more than 200, 300, 500 or even 1,000 steps.

Preferably, the measurement sensor works with an operational voltage which is higher than 1 V, 2 V, 3 V. The operational voltage might e.g. be in the range between 3 and 5 V. Typically, sensors used according to the prior art use a voltage which is (in some cases) one magnitude lower which leads to the disadvantage that for the sensors known from the prior art oscillations of the electric power supply (in particular by a battery of the pressing tool, crimping tool or cutting tool) lead to higher measurement errors. For one embodiment of the inventive sensor it is possible that the desired signal (so a measurement signal generated dependent on the maximum of the deflection or dependent on a change of a measurement signal) is more than 10%, more than 20% or even more than 30% of the power supply signal.

For the shown embodiments in each case a sensor 84 is used which senses the force or the displacement in a linear or almost linear measurement direction. However, within the frame of the invention also a sensor 84 embodied as a rotational sensor can be used which senses a rotational angle of a component 88 or of the tool jaw 5. It is also possible that the sensor 84 senses a sensor moment or torque by which the component 88 or the tool jaw 5 is supported. Also in these cases the elastic supporting element 14 and the sensor 84 are arranged in parallel arrangement. Accordingly, the elastic supporting element 14 and the sensor 84 have deflections correlating to each other and being defined by the geometry. However, the elastic supporting element 14 and the sensor 84 are biased with different forces or moments.

Within the frame of the invention, an inventive pressing tool might also be a tool which is used for generating the required pressing forces for joggling, clinching or toxing a workpiece.

The sensor 84 might have any extension in measuring direction. Preferably, the sensor 84 has an extension in measuring direction of less than 1.5 cm, 1.2 cm, 1.0 cm, 0.8 cm or 0.5 cm. In this case, despite of the small extension in the aforementioned inventive maximum deflections 85 of the sensor 84 can be provided. It is also possible that the maximum deflection 85 of the sensor 84 is more than 5%, more than 10%, more than 15%, more than 20% or even more than 30% of the extension of the sensor 84 in measuring direction.

Many variations and modifications may be made to the preferred embodiments of the invention without departing substantially from the spirit and principles of the invention. All such modifications and variations are intended to be included herein within the scope of the present invention, as defined by the following claims.

I claim:

1. A jaw tool comprising:
   a) a drive mechanism comprising a first toggle lever and a second toggle lever, and
   b) a first tool jaw and a second tool jaw, at least the first tool jaw being driven by the drive mechanism over a working stroke from an open position into a closed position generating a working force, wherein the first tool jaw is pivotable relative to the second tool jaw about a pivot joint, wherein the first toggle lever is pivotally coupled to the second toggle lever about a toggle joint, and wherein the first toggle lever is pivotably coupled to a tool head of the jaw tool;
   c) a supporting body, wherein a first one of the tool jaws and the supporting body are arranged in mechanical series arrangement and biased with the working force,
   d) wherein an elastic supporting element and a sensor are interposed between the supporting body and the first one of the tool jaws in mechanical parallel arrangement such that the sensor and the elastic supporting element are biased with correlating deflections, and
   e) a stiffness of the elastic supporting element is dimensioned such that for a maximum of an effective working force of the jaw tool the sensor is biased with a maximum deflection which is at least 1°.

2. The jaw tool of claim 1, wherein the first one of the tool jaws is supported at the supporting body by a guidance, the guidance providing a measuring degree of freedom.

3. The jaw tool of claim 2, wherein the guidance is a linear guidance and the measuring degree of freedom is a translatory measuring degree of freedom of the first one of the tool jaws relative to the supporting body.

4. The jaw tool of claim 2, wherein the guidance is a pivot joint and the measuring degree of freedom is a pivoting measuring degree of freedom of the first one of the tool jaws relative to the supporting body.

5. The jaw tool of claim 1, wherein the sensor loosely contacts at least one of the first one of the tool jaws and the elastic supporting element.

6. The jaw tool of claim 2, wherein the first one of the tool jaws, the sensor or the elastic supporting element is biased by a spring along the measuring degree of freedom.

7. The jaw tool of claim 1, wherein the elastic supporting element comprises an elastomeric body.

8. The jaw tool of claim 1, wherein the elastic supporting element comprises a metallic spring body.

9. The jaw tool of claim 2, wherein
   a) the jaw tool comprises a tool head which is not movable over the working stroke, the tool jaws being guided by the guidance relative to the tool head, and
   b) the elastic supporting element and the sensor are arranged in a force flow between the tool head and the first one of the tool jaws.

10. The jaw tool of claim 9, wherein the tool head comprises at least one cover plate
    a) which carries the guidance and
    b) at which the elastic supporting element and the sensor are supported.

11. The jaw tool claim 10, wherein at least one cover plate comprises a recess into which or through which the elastic supporting element or the sensor extends.

12. The jaw tool of claim 1, wherein the sensor is a displacement sensor.

13. The jaw tool of claim 1, wherein the sensor is a force sensor.

14. The jaw tool of claim 12, wherein a limiting device is provided by which a sensor displacement of the displacement sensor is limited.

15. The jaw tool of claim 13, wherein a limiting device is provided by which a sensor force biasing the force sensor is limited.

16. The jaw tool of claim 13, wherein
    a) the force sensor comprises an elastic sensor body,
    b) the sensor body comprises a contact surface contacting a sensor surface of the force sensor,
    c) a size of the contact surface depends on a sensor force which biases the force sensor and d) the force sensor or an associated electronic control unit determines the size of the contact surface and calculates a force measurement signal from the determined size of the contact surface.

17. The jaw tool of claim 16, wherein the sensor surface of the force sensor is formed by a series or matrix of contacts or switches.

18. The jaw tool of claim 16, wherein the size of the contact surface is sensed on the basis of
   a) a surface area of the contact surface or
   b) an extension of the contact surface into at least one representative extension direction.

19. The jaw tool of claim 17, wherein the size of the contact surface is sensed on the basis of
   a) a surface area of the contact surface or
   b) an extension of the contact surface into at least one representative extension direction.

20. The jaw tool of claim 1, wherein the jaw tool comprises an electronic control unit for evaluating a measurement signal of the sensor.

21. The jaw tool of claim 16, wherein the jaw tool comprises an electronic control unit for evaluating a measurement signal of the sensor.

22. The jaw tool of claim 21, wherein the electronic control unit comprises control logic which determines the force measurement signal from the determined size of the contact surface under consideration of
   a) a calibration factor, a calibration curve or a characteristic map,
   b) a dependency of the size of the contact surface from the sensor force biasing the force sensor,
   c) a lever arm of the sensor force,
   d) a spring characteristic of the elastic supporting element or
   e) a lever arm of a supporting force.

23. The jaw tool of claim 21, wherein the electronic control unit comprises control logic which provides an option of a calibration of the jaw tool by executing the following steps:
   a) initiating an execution of a calibration working stroke or a plurality of calibration working strokes,
   b) sensing measurement signals of the sensor during at least one calibration working stroke,
   c) determination of representative data, a calibration factor, a calibration curve or a characteristic map or an offset from at least one measurement signal of the sensor or of representative fluctuations from a plurality of measurement signals of the sensor sensed during a plurality of calibration working strokes,
   d) use of the representative data, the calibration factor, the calibration curve, the characteristic map or of the representative fluctuations for an evaluation of the quality of working processes with the jaw tool after a termination of the calibration process.

24. A jaw tool comprising:
   a) a drive mechanism comprising a first toggle lever and a second toggle lever, and
   b) a first tool jaw and a second tool jaw, at least the first tool jaw being driven by the drive mechanism over a working stroke from an open position into a closed position generating a working force, wherein the first tool jaw is pivotable relative to the second tool jaw about a pivot joint, wherein the first toggle lever is pivotally coupled to the second toggle lever about a toggle joint, and wherein the first toggle lever is pivotably coupled to a tool head of the jaw tool;
   c) a supporting body, wherein a first one of the tool jaws and the supporting body are arranged in mechanical series arrangement and biased with the working force,
   d) wherein an elastic supporting element and a sensor are interposed between the supporting body and the first one of the tool jaws in mechanical parallel arrangement such that the sensor and the elastic supporting element are biased with correlating deflections, and
   e) a stiffness of the elastic supporting element is dimensioned such that for a maximum of an effective working force of the jaw tool the sensor is biased with a maximum deflection which is at least 0.1 mm or at least 1°,
   wherein the first jaw tool and the second jaw tool are of different types or being designated for different maximum working forces, and wherein the first jaw tool and the second jaw tool comprise identical sensors but different elastic supporting elements.

25. The jaw tool of claim 16, wherein the elastic sensor body is an elastomeric body formed as at least one of a hemisphere, a calotte, or a half-cylinder.

26. The jaw tool of claim 1, wherein the drive mechanism further comprises an actuation lever positioned between the first tool jaw and the second tool jaw, wherein the actuation lever is rotatably coupled to the first tool jaw and fixedly coupled to the second tool jaw, and wherein the second tool jaw and the actuation lever are pivotable about the pivot joint.

* * * * *